(12) United States Patent
Uno et al.

(10) Patent No.: US 7,009,930 B1
(45) Date of Patent: Mar. 7, 2006

(54) OPTICAL INFORMATION RECORDING MEDIUM, METHOD OF RECORDING AND REPRODUCING, AND OPTICAL RECORDING AND REPRODUCING SYSTEM

(75) Inventors: Mayumi Uno, Osaka (JP); Noboru Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 325 days.

(21) Appl. No.: 09/913,430

(22) PCT Filed: Dec. 19, 2000

(86) PCT No.: PCT/JP00/09007

§ 371 (c)(1),
(2), (4) Date: Aug. 14, 2001

(87) PCT Pub. No.: WO01/46950

PCT Pub. Date: Jun. 28, 2001

(30) Foreign Application Priority Data

Dec. 21, 1999 (JP) .................................. 11/362948

(51) Int. Cl.
G11B 7/00 (2006.01)
B32B 3/02 (2006.01)
(52) U.S. Cl. .................. 369/275.2; 369/288; 369/286; 428/64.4; 428/64.5; 428/64.2; 430/270.13
(58) Field of Classification Search ............... 369/284, 369/288, 275.1, 275.2, 286; 428/64.1, 64.2, 428/64.4, 64.5; 430/270.13
See application file for complete search history.

(56) References Cited

U.S. PATENT DOCUMENTS

| 5,874,147 | A |   | 2/1999 | Bojarczuk et al. |
| 6,221,455 | B1 | * | 4/2001 | Yasuda et al. ............... 369/283 |
| 6,511,788 | B1 | * | 1/2003 | Yasuda et al. ............... 369/284 |

FOREIGN PATENT DOCUMENTS

| EP | 0 945 860 | 3/1999 |
| EP | 0 957 477 | 11/1999 |

(Continued)

OTHER PUBLICATIONS

Yao et al. "Optical Transition of Chalcogenide Phase-Change Thin Films". *Japanese Journal of Applied Physics*, vol. 42, No. 2B, pp. 828-831 (Feb. 2003), no day.

Primary Examiner—Hoa T Nguyen
Assistant Examiner—Jorge L. Ortiz-Criado
(74) Attorney, Agent, or Firm—Hamre, Schumann, Mueller & Larson, P.C.

(57) ABSTRACT

At least one information layer including a recording layer contains a material that can exhibit a transition between two optically different states in response to irradiation with a laser beam as a main component is provided on a substrate, and the material is configured so as to exhibit an energy gap ranging from 0.9 eV to 2.0 eV in the amorphous state. The information layer is configured to have a light transmittance of not less than 30% when irradiated with a laser beam having a wavelength ranging from 300 nm to 450 nm. It is possible to achieve excellent recording/reproduction, even if a plurality of recording layers are provided in the recording medium, when this medium is irradiated with a laser beam with a wavelength in the foregoing range from one side of the medium.

17 Claims, 11 Drawing Sheets

FOREIGN PATENT DOCUMENTS

| | | |
|---|---|---|
| EP | 1 005 036 | 5/2000 |
| EP | 1 028 421 | 8/2000 |
| JP | 5-58048 | 3/1993 |
| JP | 7-186541 | 7/1995 |
| JP | 8-104060 | 4/1996 |
| JP | 08104060 A  * | 4/1996 |
| JP | 9-198709 | 7/1997 |
| JP | 10-208296 | 8/1998 |
| JP | 11-123872 | 5/1999 |
| JP | 11-195243 | 7/1999 |
| WO | WO 96/31875 | 10/1996 |
| WO | WO 99/59143 | 11/1999 |

* cited by examiner

Refractive index

Extinction coefficient

Refractive index

Extinction coefficient

OPTICAL INFORMATION RECORDING MEDIUM, METHOD OF RECORDING AND REPRODUCING, AND OPTICAL RECORDING AND REPRODUCING SYSTEM

TECHNICAL FIELD

The present invention relates to an optical information recording medium that allows information to be recorded/reproduced thereto/therefrom at a high density and at a high speed with an optical means such as a laser beam applied thereto, as well as to a recording/reproducing method applied to the same. Furthermore, the present invention relates to an optical information recording/reproducing system in which the optical information recording medium is used.

BACKGROUND ART

Optical information recording media such as magneto-optical recording media and phase-change recording media have been known as recording media that allow mass-storage and high-speed information recording, and further, information rewriting. Such an optical information recording medium utilizes, for information recording, changes caused in optical characteristics of its recording material by partial irradiation with a laser beam. For instance, a magneto-optical recording medium utilizes, for information recording, different rotational angles of polarization planes in reflected light caused by different magnetization states. A phase-change recording medium utilizes, for information recording, a phenomenon in which a reflected light quantity with respect to light with a specific wavelength differs between when the medium is in a crystalline state and when it is in an amorphous state. The phase-change recording medium is capable of erasing information and overwriting information simultaneously by modulating an output power of a laser beam, thereby allowing information signals to be rewritten at a high speed readily.

Such optical recording media have significant merits such as random accessibility in response to needs and excellent portability, and hence has more significance in the highly information-oriented society. They are used, or considered for use, for various purposes and in various fields: for instance, for recording and storage of personal data and video information by means of computers, in medical fields, in academic researches, as a portable recording medium for use in a digital video recorder, for replacement of video tape recorders for home use. A typical example of an article in which a phase-change recording material is used is a DVD-RAM, which is randomly accessible. This is a disk-form medium with a diameter of 120 mm that has a storage capacity of 2.6 GB on one surface (5.2 GB in the case of a lamination type). Now further expansion of the storage capacity (high densification) and further increase in speed are demanded as to these optical information recording media, in response to improvement in performances of applications and image information.

Examples of means to achieve high densification that have been proposed conventionally include laser with a shorter wavelength and a higher numerical aperture for a laser beam. Each of these makes it possible to decrease a minimum size of a laser beam spot, thereby enabling high densification of recording in a direction parallel with the laser scanning direction.

As another technique for achieving high densification, a so-called multi-layer recording medium technique has been proposed, in which a medium having two or more information layers that are provided on top of the other with a transparent separation layer interposed therebetween is used and all the information layers are accessible with a laser from only one side. This technique allows the storage capacity to increase in the medium thickness direction.

Conventionally, a typical emission wavelength of a laser beam has been obtained at a red range (for instance, a specific value in a range of 650 nm to 860 nm), and a laser at a wavelength in this range was low-cost and available readily. Therefore, to realize an optical information recording medium for use with this a laser, a recording material has been developed that exhibits adequate light absorption with respect to the red wavelength range and exhibits a significant change in the optical characteristics.

In these days, however, lasers at wavelengths in a blue-violet range (for instance, wavelengths of 300 nm to 450 nm, hereinafter referred to as "blue wavelength range") that enables higher density recording have been developed, even to a merchandise level in terms of technologies. A technique of obtaining light with a wavelength half the wavelength of a laser beam by means of a second harmonic generation (SHG) element has been developed as well. This technique allows a laser beam with a wavelength of 410 nm to be obtained by using a laser with an oscillation wavelength of 820 nm. In this case, a recording material having an excellent optical characteristic in the blue wavelength range is required, but a recording material optimized for the conventional red wavelength range does not necessarily exhibit excellent characteristics in the blue wavelength range.

When a recording material with light absorption characteristics optimized for the red wavelength range is used to form a light-transmitting-type information layer on a side closer to the laser-incident side, in particular, the layer exhibits increased absorption of laser in the blue wavelength range, thereby making it difficult to improve a transmittance of the information layer. On the other hand, an attempt to improve the transmittance of the information layer makes it difficult to achieve a sufficiently great difference between optical characteristics of the information layer.

DISCLOSURE OF THE INVENTION

An object of the present invention is to solve the aforementioned problems, and to provide an optical information recording medium having an information layer with desirable light absorption characteristics with respect to light in the blue wavelength range. More specifically, an object of the present invention is to provide an optical information recording medium having a light-transmitting-type information layer that exhibits a high light transmittance with respect to light in the blue wavelength range and that provides a high contrast. Furthermore, another object of the present invention is to provide a recording/reproducing method applicable to the foregoing optical information recording medium, and an optical information recording/reproducing system in which the foregoing optical information recording medium is used.

To achieve the foregoing objects, according to the present invention, an optical information recording medium includes one or more information layers including recording layers, respectively, and each recording layer contains a material that can exhibit transition between two optically different states in response to irradiation with a laser beam as a main component. In the optical information recording medium, in at least one of the recording layers, one of the two states of the material is an amorphous state, and the material has an energy gap ranging from 0.9 eV to 2.0 eV in the amorphous state.

This allows desirable light absorption characteristics to be obtained even in the case where a laser beam with a shorter wavelength than conventionally is used, and therefore, makes it possible to provide an optical information recording medium that exhibits excellent recording characteristics in the short wavelength range. Incidentally, in the present specification, "main component" indicates a content of not less than 50 atomic percent (at %). Besides, the foregoing information layer may be composed of only a recording layer, or it also may be a multi-layer film including a recording layer.

This optical information recording layer is suitable for recording/reproduction by a laser beam with a wavelength ranging from 300 nm to 450 nm.

Furthermore, in the optical information recording medium of the present invention, the information layer including the recording layer that contains the material as a main component thereof has a light transmittance of not less than 30%, preferably not less than 50%, when irradiated with a laser beam having a wavelength in the foregoing range. With this configuration, in the case where, for instance, two information layers are provided, excellent recording/reproduction of information is achieved only by irradiation with a laser beam in the same direction (usually from the substrate side), even with respect to the farther information layer from the light-incident side as well. It should be noted that here, more specifically, the transmittance with respect to the laser beam is determined according to a transmittance in the case where information is recorded in the information layer.

In the optical information recording medium of the present invention, in at least two of the information layers, each including a recording layer containing, as a main component, a material that can exhibit transition between two optically different states in response to irradiation with a laser beam that is incident on the recording layers from the same direction is used. Thus, by providing the optical information recording medium in a so-called multi-layer recording medium form (a configuration in which a plurality of information layers are provided), the recording capacity of the medium can be increased efficiently.

According to the present invention, as compared with a case where a conventional recording material for the red wavelength range is used, optimization of a light absorption of the medium is facilitated even with respect to a short wavelength range. Therefore, it is possible to allow the medium to have a higher light transmittance and a greater contrast. Consequently, it is possible to make the light transmittance of the information layer higher, thereby providing a high-performance multi-layer recording medium.

In the case of a multi-layer recording medium, more specifically, in the case where the optical information recording medium includes not less than two information layers, in at least one of the information layers closest to a laser beam incident side, the material as the main component of the recording layer in the information layer preferably exhibits an energy gap ranging from 0.9 eV to 2.0 eV in the amorphous state. Furthermore, the foregoing information layer preferably has a light transmittance of not less than 30% when irradiated with a laser beam with a wavelength ranging from 300 nm to 450 nm.

In the foregoing optical information recording medium, at least one of the recording layers contains a material that can exhibit reversible transition between a crystalline state and an amorphous state, as a main component. In this case, a reflectance Rc of the recording layer with respect to the laser beam when the recording layer is in the crystalline state preferably is higher than a reflectance Ra thereof with respect to the laser beam when the recording layer is in the amorphous state (Rc>Ra). In this preferable example, a higher transmittance is obtained while a high light absorptance is maintained.

Furthermore, in the optical information recording medium including the reversibly changeable recording layer, a light absorptance Ac of the recording layer with respect to the laser beam when the recording layer is in the crystalline state preferably is higher than 80% of a light absorptance Aa thereof when the recording layer is in the amorphous state (Ac>0.8 Aa), more preferably, Ac>Aa. This causes deformation of recording marks to be minimized even in the case where overwriting recording is carried out, thereby allowing excellent recording characteristics to be obtained.

Furthermore, in an optical information recording medium including the foregoing reversibly changeable recording layer, with respect to the wavelength range of 350 nm to 450 nm, the recording layer satisfies the relationship expressed as:

na>2.5;
nc>2.5; and
ka<2.0 where nc represents a refractive index in the crystalline state, na represents a refractive index in the amorphous state, and ka represents an extinction coefficient in the amorphous state. This makes it easier to provide a medium with a high transmittance and a great optical characteristic difference.

More specifically, kc (extinction coefficient in the crystalline state) and ka preferably satisfy relationship in that an absolute value of a difference between kc and ka (|kc−ka|) is not less than 0.5. This makes it possible to obtain a greater optical characteristic difference. Furthermore, na and nc preferably satisfy the relationship expressed as na−nc<1.0. In this preferable example, the relationship of Ac>0.8 Aa is established more readily, and this causes deformation of recording marks to be minimized even in the case where overwriting recording is carried out, thereby allowing excellent recording characteristics to be obtained.

The recording layer preferably contains a phase changeable material containing at least one of Te and Se. This makes it possible to obtain a greater optical characteristic difference between the two states easily.

In the case where the recording layer contains Se, a content of Se in the recording layer preferably is not less than 20 at % and not more than 60 at %, more preferably, not more than 50 at %. This preferable example allows an energy gap in an optimal range of 0.9 eV to 2.0 eV to be obtained readily, thereby making it possible to provide a recording material that exhibits high stability when in the amorphous state and that has a high crystallization kinetic.

In the case where the recording layer contains Te, the recording layer preferably contains X (X represents at least one element selected from In, Al, Ga, Zn, and Mn) at the same time. This makes it possible to obtain an energy gap of 0.9 eV to 2.0 eV easily. Furthermore, a content of Te in the recording layer preferably is between 20 at % and 60 at %. A content of X therein preferably is between 20 at % and 50 at %. In the case where the contents are in the foregoing ranges, it is possible to provide a recording material that exhibits high stability when in the amorphous state and that has a high crystallization kinetic.

In the case where the recording layer contains at least one of Te and Se, the recording layer preferably further contains at least one element selected from Al, Ga, In, Si, Ge, Sn, Sb, Bi, Sc, Ti, Nb, Cr, Mo Co, Cu, Ag, Au, Pd, N, and O. The recording layer to which such a material is added exhibits improved stability in the amorphous state, a higher crystallization kinetic, and improved repetitive recording characteristics.

In the optical information recording medium including the phase changeable recording layer, the information layer preferably includes a crystallization promoting layer that is provided on at least one side of the recording layer so as to be in contact with a surface of the recording layer on the side. Furthermore, the crystallization promoting layer particularly preferably contains N. The crystallization promoting layer allows a time required for crystallization of the recording material to be shortened, thereby ensuring a higher-speed recording.

In the foregoing optical information recording medium, the recording layer preferably has a thickness ranging 1 nm to 25 nm. This makes it possible to provide an information layer that has excellent recording characteristics, a high transmittance, and minimum of adjacent erasure. The recording layer contains, as a main component, a material that can exhibit reversible transition between a crystalline state and an amorphous state preferably has a thickness ranging from 1 nm to 15 nm.

Furthermore, the present invention provides a method for recording, reproducing or erasing information with use of the optical information recording medium described above. This method is characterized by irradiating the material as the main component of the recording layer of the medium with a laser beam converged to a microspot by an optical system so as to cause the material to shift to an optically different state. The method also is characterized in that the laser beam used for recording the information is set so as to have a wavelength ranging from 300 nm to 450 nm. This enables recording of information to the optical information recording medium at a high density, and reproduction of the information therefrom.

Furthermore, the present invention provides an optical information recording/reproducing system in which the above-described optical information recording medium is used. The recording/reproducing system includes the foregoing optical information recording medium, and a laser beam source for generating a laser beam that has a wavelength ranging from 300 nm to 450 nm to irradiate the optical information recording medium.

DESCRIPTION OF THE INVENTION

Figure 1:
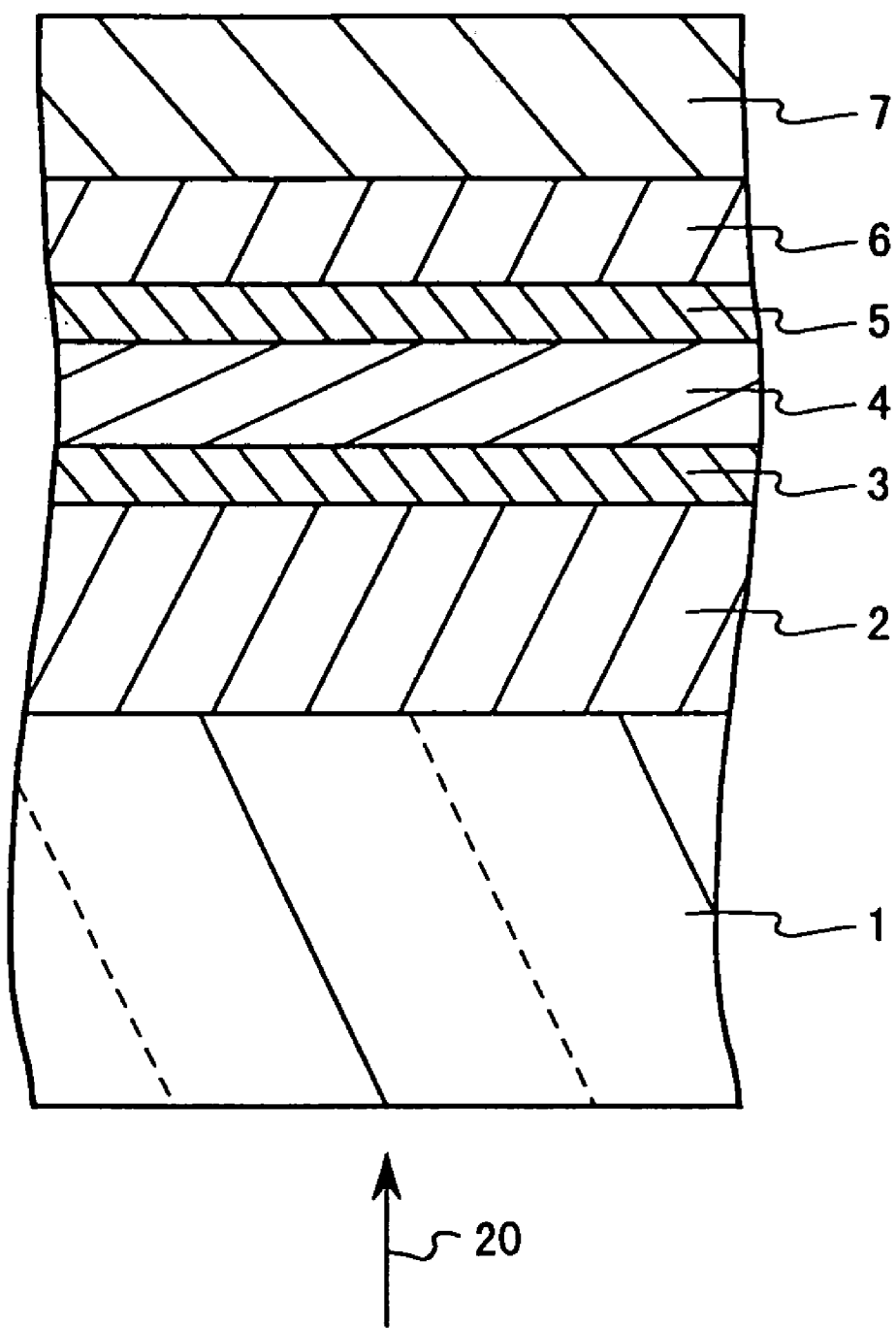
FIG. 1 is a cross-sectional view illustrating one embodiment of a layer configuration of an optical information recording medium of the present invention.

The following description will depict a preferred embodiment of the present invention, while referring to the drawings.

An example of a layer configuration of an optical information recording medium is shown in FIG. 1. In this configuration example, a first protective layer 2, a first interface layer (crystallization promoting layer) 3, a recording layer 4, a second interface layer (crystallization promoting layer) 5, a second protective layer 6, and a reflection layer 7 are laminated on a substrate 1 in the stated order.

The configuration of the optical information recording medium of the present invention, however, is not limited to the configuration shown in FIG. 1 but may be configured variously, for instance, as follows: another layer may be provided between the protective layer 6 and the reflection layer 7; the reflection layer 7 may be composed of two reflection layers; another layer may be provided between the substrate 1 and the protective layer 2; the protective layer 2 entirely may be replaced with the interface layer 3; the protective layer 6 entirely may be replaced with the interface layer 5; the interface layer 3 and/or the interface layer 5 may be omitted; or, other layers may be provided on a side of the reflection layer 7 to which a laser beam 20 is incident and on an opposite side of the same.

In the case where the recording layer 4 contains as a main component a material that exhibits an irreversible change, in particular, the optical information recording medium may be configured so that only the recording layer 4 is provided on the substrate 1, or so that only the recording layer 4 and the protective layer 6 are provided on the substrate 1, or alternatively, so that the protective layer 2, the recording layer 4, and the protective layer 6 are provided on the substrate 1 in the stated order.

The substrate 1 preferably is made of a resin such as polycarbonate or PMMA, or glass, and is provided with guide grooves (grooves) for guiding the laser beam 20. It should be noted that it is preferable to use a material that causes the substrate 1 to have a minimum of light absorption with respect to laser beam wavelengths used for signal recording/reproduction.

The protective layers 2 and 6 are provided mainly with a view to protecting the recording material and allowing adjustment of optical characteristics, such as allowing effective light absorption at the recording layer. As materials of the protective layers 2 and 6, materials that allow the foregoing objects to be achieved are utilized. Examples of such materials include: sulfides such as ZnS; selenides such as ZnSe; oxides such as Si—O, Al—O, Ti—O, Ta—O, and Zr—O; nitrides such as Ge—N, Cr—N, Si—N, Al—N, Nb—N, Mo—N, Ti—N, Zr—N, and Ta—N; nitrogen oxides such as Ge—O—N, Cr—O—N, Si—O—N, Al—O—N, Nb—O—N, Mo—O—N, Ti—O—N, Zr—O—N, and Ta—O—N; carbides such as Ge—C, Cr—C, Si—C, Al—C, Ti—C, Zr—C, and Ta—C; fluorides such as Si—F, Al—F, and Ca—F; other dielectrics; and suitable combinations of these (for instance ZnS—SiO$_2$).

The interface layers 3 and 5 serve for protection of the recording layer, for instance, for prevention of oxidation, corrosion, and deformation of the recording layer 4. At the same time, the interface layers 3 and 5 play important roles in improving repetitive recording characteristics by preventing mutual diffusion of atoms constituting the recording layer 4 and atoms constituting the protective layers 2 and 6, and in improving erasure characteristics by promoting crystallization of the recording layer 4. The interface layers 3 and 5 may be provided only at one of the interfaces of the recording layer 4. However, to sufficiently achieve the foregoing effect, they preferably are provided on both sides of the recording layer 4. In the case where the recording layer 4 is relatively thin (for instance, 1 nm to 15 nm in thickness), this tends to hinder crystallization of the recording layer, but provision of the interface layers 3 and 5 on both the sides of the recording layer 4 can promote the crystallization of the recording layer, thereby ensuring a high erasure performance.

Incidentally, components contained in the interface layers 3 and 5 possibly may be diffused in the recording layer 4 as information recording is repeatedly carried out. Considering this, it is preferable that materials hardly hindering optical changes in the recording layer 4 are used to form the interface layers 3 and 5. The interface layers 3 and 5 may be made of the materials suggested above as the materials for the protective layers 2 and 6, and the following materials may be used as a main component to form the interface layers 3 and 5: nitrides such as Ge—N, Cr—N, Si—N, Al—N, Nb—N, Mo—N, Ti—N, Zr—N, and Ta—N; nitrogen oxides such as Ge—O—N, Cr—O—N, Si—O—N, Al—O—N, Nb—O—N, Mo—O—N, Ti—O—N, Zr—O—N, and Ta—O—N; oxides such as Si—O, Al—O, Ti—O, Ta—O, and Zr—O; carbides such as Ge—C, Cr—C, Si—C, Al—C, Ti—C, Zr—C, and Ta—C; fluorides such as Si—F, Al—F, and Ca—F; other dielectrics; and suitable mixtures of these.

A dense film often can be obtained as the interface layer in the case where a nitride or a nitrogen oxide is used as the main component, and such a film is preferable since the foregoing effects are obtained remarkably. It should be noted that a sulfide or a selenide may be mixed in the interface layer according to conditions, but in this case, it is necessary to select compositions and forming conditions of the interface layers 3 and 5 so that sulfur should not be diffused in the recording layer 4.

The interface layers 3 and 5 preferably have a thickness of not less than 1 nm each. This is because the effect of preventing diffusion of atoms between the protective layers 2 and 6 and the recording layer 4 deteriorates in the case where the film thickness is less than 1 nm.

The reflection layer 7 preferably is made of a metal such as Au, Ag, Cu, Al, Ni, Cr, or Ti, or an alloy of metals appropriately selected from these. The reflection layer 7 is provided with a view to attaining a heat radiating effect or an optical effect such as an effective light absorption at the recording layer 4. When, for instance, a layer configuration is capable of sufficient heat radiation, however, the reflection layer 7 is not indispensable. In the case where the reflection layer 7 is provided, it preferably has a thickness of not less than 1 nm. Otherwise, namely, when the thickness is less than 1 nm, the reflection layer 7 hardly can be formed in a film form with a uniform thickness, thereby impairing the thermal and optical effects.

The following description will depict the recording layer 4. The recording layer 4 contains, as a main component, a material that can exhibit a transition between two optically different states in response to an energy beam such as the laser beam 20 irradiating the same, and one of the two different states is an amorphous state.

The material constituting the main component of the recording layer 4 preferably is a material that can exhibit reversible transition between two different states, but a material that exhibits irreversible transition between the states may be used also. An example of reversible transition is transition between an amorphous state and a crystalline state. Examples of irreversible transition include transition from an amorphous state to an oxidized state, and transition from an amorphous state to a state undergoing a certain structural change such as volume change, density change, perforation due to film damage, etc.

Which type of recording material should be used, the reversibly changeable type or the irreversibly changeable type, is determined with the conditions required of the medium taken into consideration. For instance, in the case where an extremely low-cost medium mainly for archival memory use is needed, an irreversibly changeable recording material is used as a main component of the recording layer 4, so that a write-once medium (W/O medium) that is subjected to writing only once is formed. On the other hand, in the case where information rewriting is to be conducted, it is necessary to use a reversibly changeable recording material. A reversibly changeable material, however, can be used for forming a W/O medium.

An optical energy gap in the case where the recording layer 4 is in an amorphous state (hereinafter referred to as $E_0$) is set to not less than 0.9 eV, and not more than 2.0 eV.

The following description will depict a method for determining an optical gap energy. An absorption spectrum in the vicinity of a fundamental absorption edge of an amorphous semiconductor is described approximately by the formula (1) below that is known as a Tauc plot (see, for instance, "Amorphous Semiconductor" published by Baifukan, page 38, Formula (3.8)):

$$\alpha(E) \cdot E \propto (E-E_0)^2 \qquad (1)$$

where $\alpha(E)$ represents an absorption coefficient, E represents an energy of light, and $E_0$ represents an optical gap energy.

Here, considering $\alpha(E) \propto ka(E) \cdot E$ (where $ka(E)$ represents an extinction coefficient of the material with respect to light with an energy E), the following formula (2) is derived:

$$(ka(E))^{1/2} \cdot E \propto E-E_0 \qquad (2)$$

According to the formula (2), when the energy E of light is varied (in other words, the wavelength of the light is varied), the value of $(ka(E))^{1/2} \cdot E$ and the value of E have a linear relationship therebetween, as is expressed by a straight line in a plane formed by an x axis indicating the value of E and a y axis indicating the value of $(ka(E))^{1/2} \cdot E$. Here, an X-axis segment of this straight line indicates an optical gap energy $E_0$.

Figure 2:
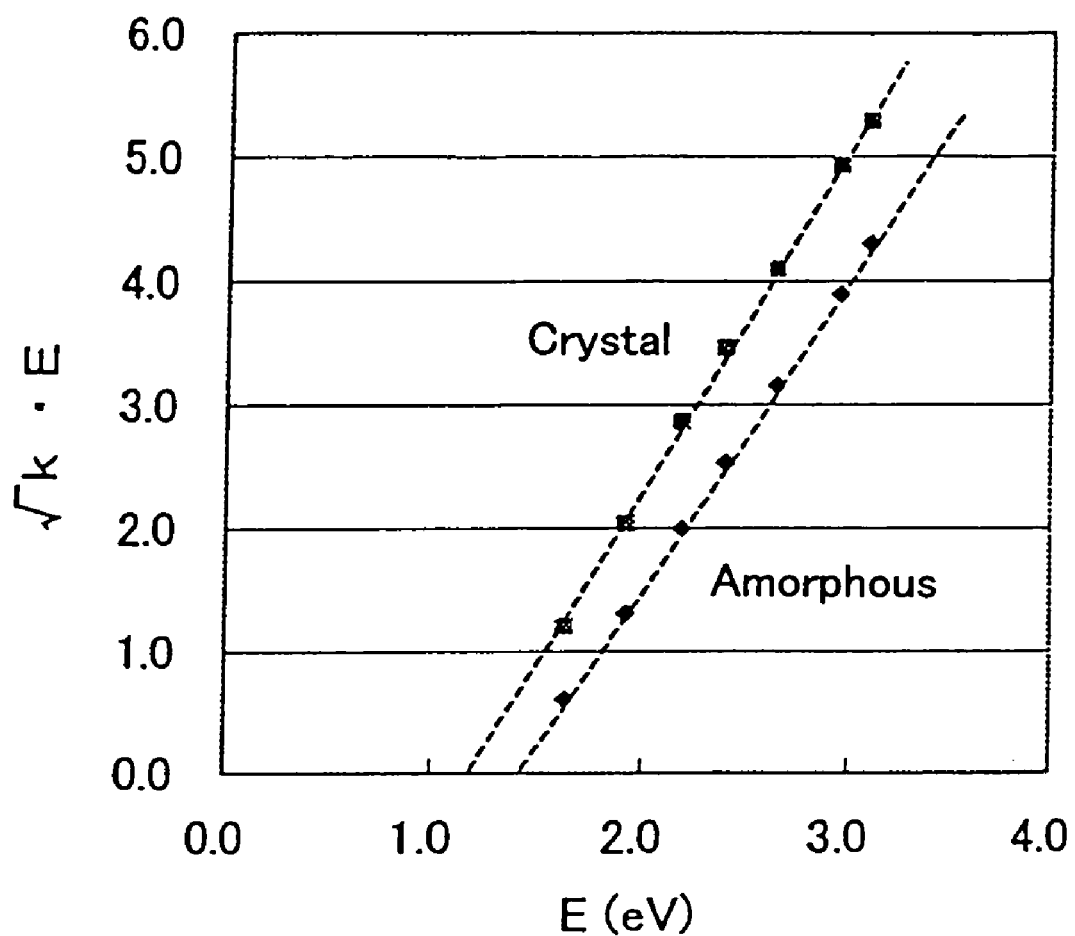
FIG. 2 is an explanatory view illustrating an example of a method for determining an energy gap of a material of a recording layer.

FIG. 2 shows $E_0$ in the case of $Sb_2Se_3$ as an example of a recording layer material that can exhibit reversible transition between the amorphous state and the crystalline state. Measurement of $ka(E)$ was carried out by ellipsometry using a sample with a thickness of 10 nm. According to the graph, $E_0$ of $Sb_2Se_3$ in the amorphous state was found to be 1.39 eV. $E_0$ of $Sb_2Se_3$ in the crystalline state was found to be 1.16 eV. For comparison, $E_0$ of $Ge_2Sb_2Te_5$, which is known as a material having excellent characteristics in the red wavelength range, was determined in the same manner. As a result, the value of $E_0$ of $Ge_2Sb_2Te_5$ was found to be 0.73 eV in the amorphous state, and 0.35 eV in the crystalline state.

It should be noted that the recording layer preferably is configured so that substantially the entirety of the same is made of a material having an energy gap ranging 0.9 eV to 2.0 eV when it is in the amorphous state. As long as the object of the present invention is achieved, however, another minor component may be contained therein at a rate not exceeding 50 at %, preferably not exceeding 10 at %.

The following description will depict the relationship between the value of $E_0$ of the recording layer and the optical characteristics of the optical information recording medium.

Figure 3A:
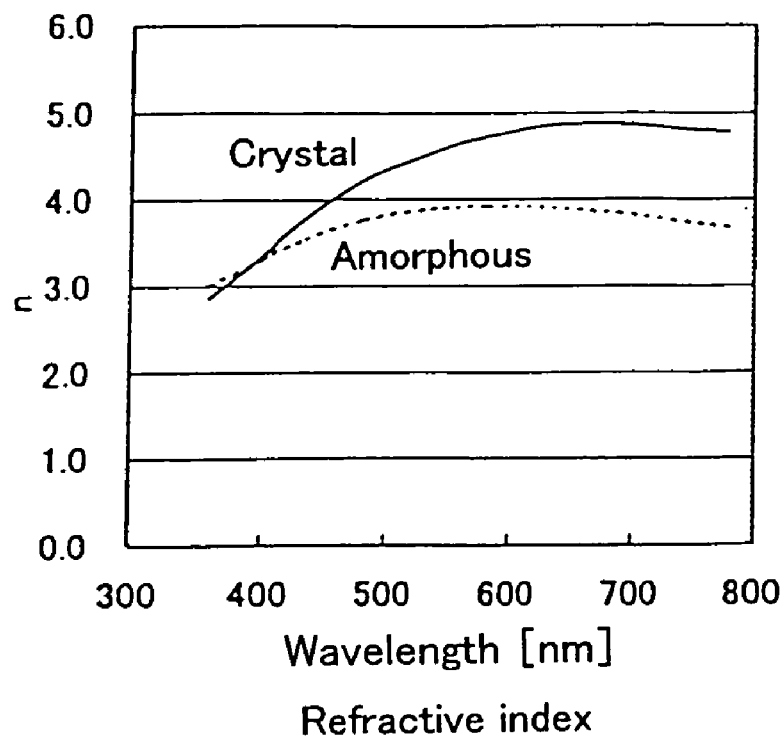
FIG. 3 is a view showing examples of optical constants of a material of a recording layer.
Figure 3B:
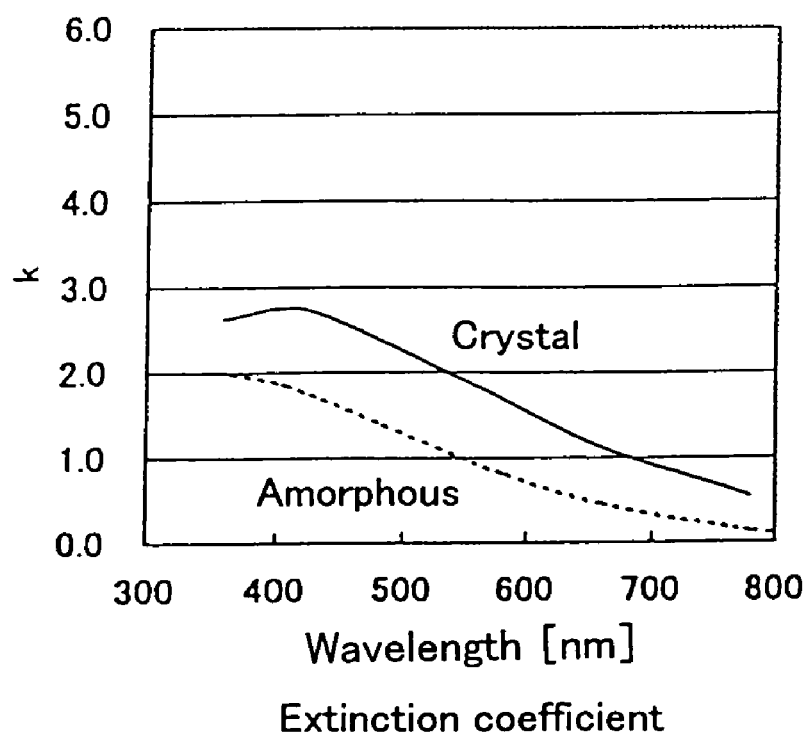
Figure 4A:
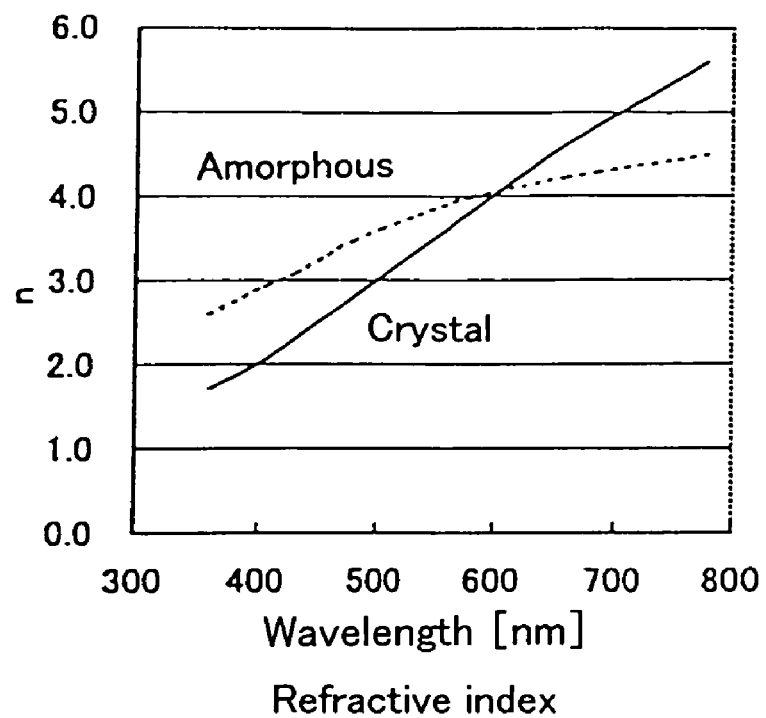
FIG. 4 is a view showing examples of optical constants of a material that conventionally is used for forming a recording layer.
Figure 4B:
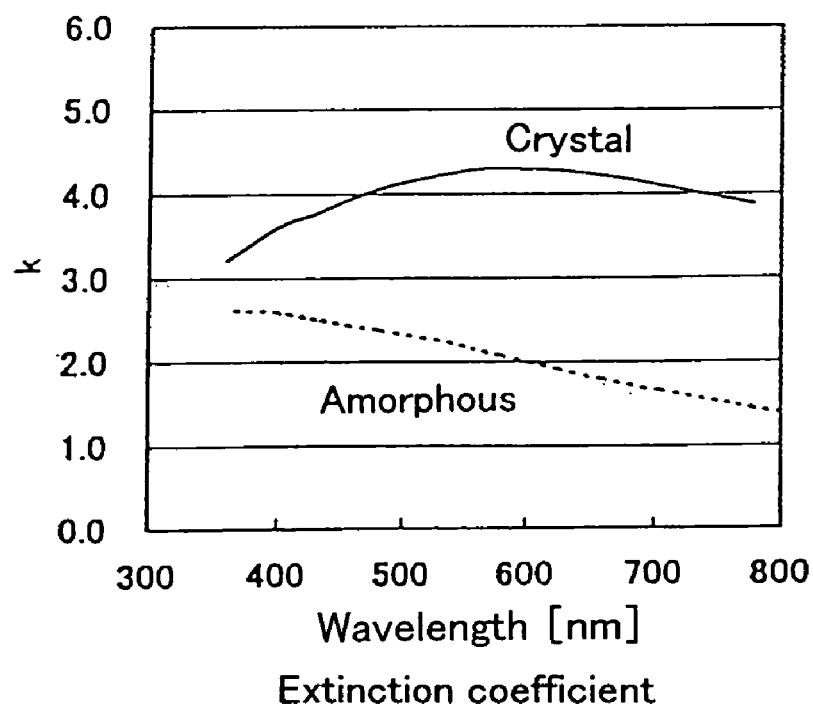

FIGS. 3A and 3B illustrate the outcomes of measurement regarding the wavelength-dependent refractive index and the wavelength-dependent extinction coefficient of $Sb_2Se_3$, respectively. FIGS. 4A and 4B illustrate the outcomes of measurement regarding the wavelength-dependent refractive index and the wavelength-dependent extinction coefficient of $Ge_2Sb_2Te_5$, respectively. Here, the refractive index is equivalent to the real part of the complex refractive index, and the extinction coefficient is equivalent to the imaginary part of the complex refractive index.

Comparing FIG. 3B and FIG. 4B, it can be seen that peaks of the extinction coefficient of $Sb_2Se_3$ both in the amorphous state and in the crystalline state shift to the short wavelength side, as compared with those of the $Ge_2Sb_2Te_5$. For instance, $Ge_2Sb_2Te_5$ in the amorphous state has an extinction coefficient of not more than 2.0 when the wavelength is in a range of not less than 600 nm, while $Sb_2Se_3$ has an extinction coefficient at the same level when the wavelength is in a range of not less than 350 nm. Further, comparing FIG. 3A and FIG. 4A, $Ge_2Sb_2Te_5$ both in the amorphous state and in the crystalline state exhibits a decrease in the refractive index on the short wavelength side, while $Sb_2Se_3$ exhibits such a decrease in the refractive index further on the short wavelength side. Thus, $Sb_2Se_3$ exhibits optical characteristics that shift to the short wavelength side, as compared with $Ge_2Sb_2Te_5$. This is because the value of the optical gap energy of $Sb_2Se_3$ is high relative to that of $Ge_2Sb_2Te_5$, and hence it has an absorption edge further on the short wavelength side.

Generally, extinction coefficients of an amorphous material and a semiconductor material with respect to a wavelength in the vicinity of absorption edges gradually increase as the wavelength decreases. In the case where a material with a relatively greater optical energy gap is used, the absorption edge shifts to the high energy side (short wavelength side), and therefore, the increase in the extinction coefficient takes place further on the short wavelength side. The utilization of this principle allows absorption of light with a certain specific wavelength in the recording layer to be adjusted optimally by adjusting the optical gap energy of the recording material. The inventors of the present invention focused on this principle, and determined values of optical gap energy of various phase-change materials, and measured optical constants of these materials. As a result, they discovered that, as to the so-called blue wavelength range, when a material was used that had an optical gap energy $E_0$ of not less than 0.9 eV and not more than 2.0 eV in the amorphous state, an optimal extinction coefficient was obtained, whereby light absorption was optimized.

Figure 5:
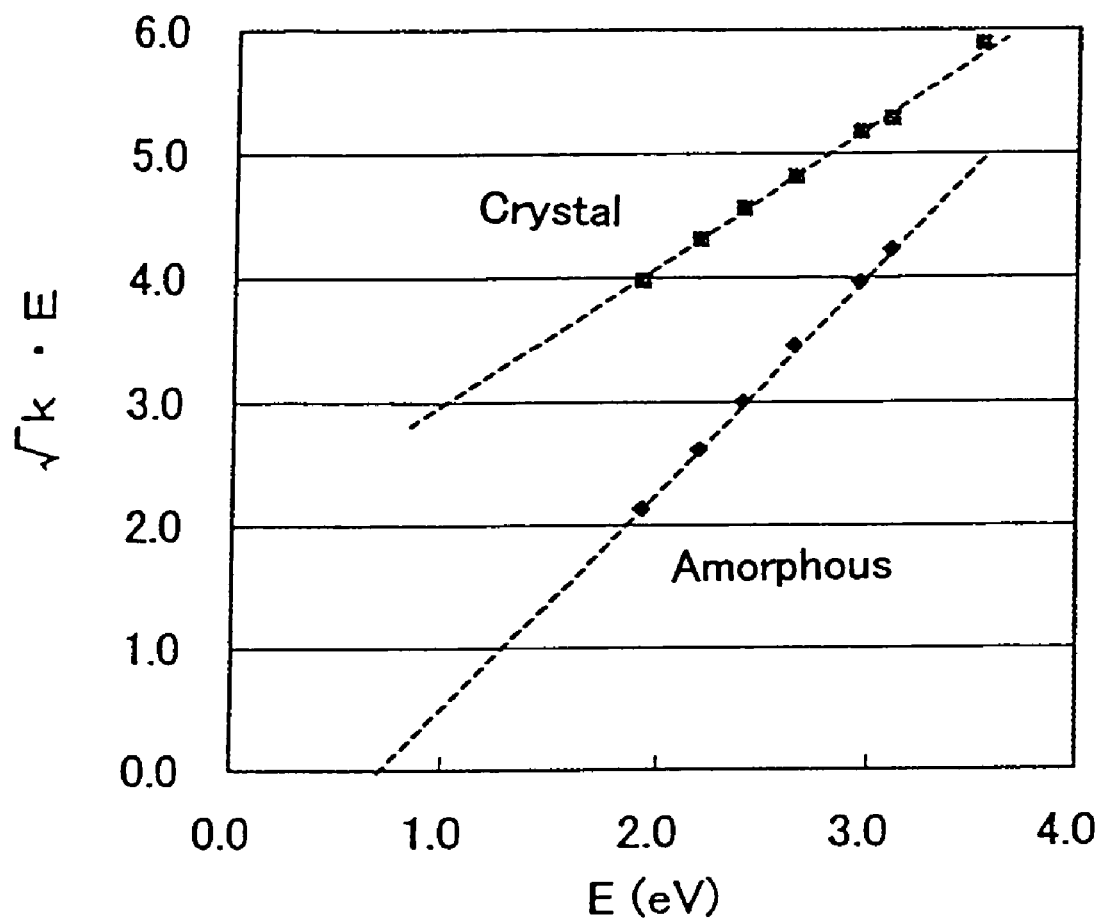
FIG. 5 is a view illustrating another example of a method for determining an energy gap of a material of a recording layer.

In the case where the recording layer is in the crystalline state, it seems difficult to determine the optimal range of the optical gap energy. This is because in some cases the phase change from the amorphous state to the crystalline state leads to, not only the absorption edge shift, but also transition from a semiconductor to a half metal. For instance, FIG. 5 shows a graph for determining an optical gap energy of $Ge_4Sb_2Te_7$. According to FIG. 5, $E_0$ in the amorphous state is found to be approximately 0.73 eV, but by the same method, $E_0$ in the crystalline state cannot be found to be a positive value. A tilt of the straight line in FIG. 5 in the amorphous state significantly differs from that in the crystalline state. This is because the phase change from the amorphous state to the crystalline state involves, not only the absorption edge shift, but also transition from the semiconductor state to the half metal state. In such a case as this, however, excellent optical characteristics are obtained with respect to the blue wavelength range as long as the value of $E_0$ in the amorphous state is in the foregoing range. Generally, a material that exhibits the phase change as shown in FIG. 5 is rather preferable, since the phase change tends to involve an increased change in the optical characteristics, rather than the absorption edge shift.

Incidentally, as shown in FIG. 2, in the case of a material whose $E_0$ in the crystalline state is found to be a positive value, the material preferably satisfies:

$$E_0(c) < E_0(a) - 0.15$$

where $E_0(c)$ represents an optical gap energy in the crystalline state, and $E_0(a)$ represents an optical gap energy in the amorphous state. When this condition is satisfied, this means that the optical characteristics in the crystalline state and those in the amorphous state differ sufficiently from each other, and hence, it is possible to obtain a high C/N ratio readily.

In the case where a material whose optical gap energy $E_0$ in the amorphous state is less than 0.9 eV, an excessively great extinction coefficient is obtained with respect to wavelengths ranging 350 nm to 450 nm. This leads to an increase in light absorption in a recording layer with respect to the laser beam. Therefore, with this material, it particularly is difficult to form an information layer with a high transmittance. Besides, since empirically the refractive index often decreases as the extinction coefficient increases, the use of the foregoing material often makes it difficult to obtain a high C/N ratio and a high reflectance as a medium.

On the other hand, in the case where a material whose $E_0$ is more than 2.0 eV, the absorption edge excessively shifts to the short wavelength side, thereby causing the extinction coefficient to be excessively small in the blue wavelength range. In this case, the thickness of the recording layer 4 is required to be increased to approximately 50 nm, since otherwise the recording sensitivity lowers. Such an increase in the thickness of the recording layer 4, however, leads to problems such as adjacent mark erasure due to in-plane heat diffusion in the recording layer, and an increase in a heat capacity that causes a cooling speed to lower, thereby disabling the formation of sufficient-size recording marks (amorphous marks), and hence, lowering the C/N ratio. Furthermore, generally a material having an excessively great $E_0$ tends to have a small refractive index, and hence tends to cause inconveniences such as insufficient C/N ratio and an insufficient reflectance.

For the foregoing reasons, a material with $E_0$ in the amorphous state ranging from 0.9 eV to 2.0 eV is used for forming the recording layer 4. $E_0$ preferably is not less than 1.0 eV, and more preferably not less than 1.5 eV.

The material of the recording layer 4, as described above, preferably satisfies na>2.5>, nc>2.5, and ka<2.0, with respect to wavelengths in the laser beam wavelength range, more specifically throughout the wavelength range from 350 nm to 450 nm. When nc or na is not more than 2.5, a light absorptance of the recording layer decreases, thereby likely causing inconveniences, such as lowered recording sensitivity and insufficient reflectance. Further, when ka is not less than 2.0, light absorption at the recording layer excessively increases, thereby making it difficult to form an information layer of the light transmission type. Incidentally, a material satisfying the foregoing conditions exhibits an excellent property with respect to the wavelengths ranging from 300 nm to 350 nm, as compared with the material for red wavelength range use.

Furthermore, kc and ka more preferably satisfy a condition that an absolute value of a difference between kc and ka is not less than 0.5 (|kc−ka|>0.5). A difference between the optical characteristics increases as the difference between the extinction coefficients increases, thereby allowing a higher C/N ratio to be obtained. Further, na and nc more preferably satisfy the relationship expressed as na−nc≦1.0. This is because when nc is great relative to na, it is easier to design the recording layer 4 so that a light absorptance Ac of the recording layer 4 in the crystalline state is greater than a light absorptance Aa of the recording layer 4 in the amorphous state. As will be described later in detail, when Ac>0.8Aa, it is possible to compensate a difference between a temperature rise in a crystalline part and a temperature rise in an amorphous part in the recording layer 4, which is caused by the latent heat of crystallization, thereby allowing the heat balance to be maintained. This makes it possible to reduce mark deformation that takes place upon overwrite recording.

The recording layer 4 preferably is made of a material that has a high crystallization kinetic, and exhibits high stability in the amorphous state. For this purpose, it is necessary to select a recording layer material appropriately, regarding its composition, crystalline structure, temperature of crystallization, melting point, etc. Generally, when the crystalline structure is a NaCl-type fcc structure, it is likely to obtain a high crystallization kinetic. This seems to be because, in the case of the NaCl type, only small atom migration takes place upon the phase change from the amorphous state to the crystalline state, thereby allowing the crystallization kinetic to increase generally. The mechanism of crystallization process, however, is not simple, and all factors determining the crystallization kinetic have not been discovered completely.

A material is more crystallizable if it has a low crystallization temperature, whereas the stability of the material in the amorphous state deteriorates if the crystallization temperature is excessively low. Generally, a material having a crystallization temperature in a range of 150° C. to 250° C. is preferable. Further, since the use of a material having an excessively high melting point causes the recording sensitivity to lower, it is preferable to select an optimal value as to the melting point (for instance, around 500° C. to 750° C.).

Specific examples of materials forming the recording layer 4 include phase-changeable materials containing Se as a main component. They are materials containing as main components, for instance, Sb—Se, Sn—Se, Se—Ge, Se—Si, In—Se, Ga—Se, Al—Se, and Bi—Se, respectively. A material containing Se as a main component generally has a great optical gap energy, as compared with a material containing Te as a main component, and many of the foregoing materials satisfy the condition that the optical gap energy is between 0.9 eV and 2.0 eV. When a content of Se is lower than 20 at %, it is difficult to get an optical gap energy of not less than 0.90 eV. Therefore, the content of Se preferably is not less than 20 at %.

To satisfy the condition that $E_0$ is in a range of 0.9 eV to 2.0 eV, it is necessary to adjust a composition ratio of elements constituting the recording layer, taking the respective periodicities of the elements in the periodic table into consideration. Generally, a material containing a high proportion of an element with a great specific gravity tends to have a small value of $E_0$, while a material containing a high proportion of an element with a low specific gravity tends to have a great value of $E_0$. This is because, in the case where a recording material is composed of elements of relatively low specific gravities, the interatomic distance tends to be short, thereby causing the energy gap of atom vibration (equivalent to lattice vibration in the crystalline state) to increase, whereas, in the case where the a recording material is composed of elements of relatively great specific gravities, the interatomic distance tends to be long, thereby causing the energy gap to decrease.

Actually the inventors of the present invention confirmed by experiments that even in the case where the same kinds of elements were used, a composition containing a high proportion of elements of great specific gravities had a small value of $E_0$, while a composition containing a high proportion of elements of low specific gravities had a great value of $E_0$.

To form a recording material having $E_0$ in a range of 0.9 eV to 2.0 eV according to the present invention, the content of elements in the fifth period (In, Sn, Sb, Te, etc.) or thereafter (elements with atomic numbers not smaller than the atomic number of Rb) preferably is not more than 85 at %, more preferably, not more than 65 at %. The material preferably contains substantially no element in the sixth period (including Tl, Pb, and Bi, that is, elements with atomic numbers not smaller than the atomic number of Cs). Further, even in the case where the content of the elements in the fifth period or thereafter is more than 85 at %, it is possible to adjust the value of $E_0$ in the range of the present invention, by causing the material to contain not less than 5 at % of elements of relatively low specific gravity, for instance, elements in the third period (Al, Si, P, S).

As the material for forming the recording layer 4, preferable is a material that contains the above-exemplified binary Se compound as a main component, and further, some additives. As to the additive, it is preferable that a third material is added alone, or that third and fourth materials are added in combination.

The third material is added mainly with a view to adjustment of the crystallization kinetic and expansion of differences between optical characteristics in the amorphous state and those in the crystalline state. Examples of the third material include Al, Ga, In, Si, Ge, Sn, Sb, Bi, Sc, Ti, Nb, Cr, Mo, Co, and appropriate mixtures of any of these. Ge, In, Sn, and Bi are preferable in particular. The third material preferably is selected from the group consisting of materials other than the binary components contained as the main component.

The fourth material is added for the purpose of improving the repetitive recording characteristics, preventing oxidation of the recording layer 4, and the like. Preferably applicable as the fourth material are Cu, Ag, Au, Pd, Pt, N, O, Cr, Al, Si, and appropriate mixtures of any of these. By adding such a material, the material flow of the recording layer 4 upon repetitive recording is suppressed, whereby the repetitive recording characteristics can be enhanced. By adding a material that is oxidized easily and whose oxide exhibits poor solubility in water, for instance, Cr, Al, or Si, corrosion resistance and oxidation resistance of the recording layer 4 are improved drastically.

The following description will depict a preferable process for determining a composition ratio of the recording layer 4. First of all, as to the binary material as a base, a composition ratio of Se and an element other than Se is varied so that an optimal composition is selected with which both a high crystallization kinetic and a high stability in the amorphous state are obtained. Then, the third material is added thereto, whose added quantity is varied, so that an optimal added quantity is determined with which a maximum difference between optical characteristics in the amorphous state and in the crystalline state, and both high crystallization kinetic and a high stability in the amorphous state are obtained. Furthermore, to the trinary material thus determined, the fourth material is added while a quantity of the same is varied, so that an added quantity that provides most excellent repetitive recording characteristics and corrosion resistance is determined.

Specific examples of preferable materials containing Se include Se—In—Ge, Se—Sb—Ge, Se—Sn—In, Se—Sn—Al, Se—Bi—Ge, Se—In—Ge—N, and Se—Bi—Al—N.

Other examples of materials for forming the recording layer include phase-change materials containing Te as a main component. The materials containing Te as a main component generally have an optical gap energy that is small relative to that of the material containing Se, but some of the at same satisfy the condition that the optical gap energy is not less than 0.9 eV. They are, for instance, $In_2Te_3$, InTe, $Ga_2Ta_3$, GaTe, $Al_2Te_3$, ZnTe, and MnTe.

In the case where a recording layer containing Te is used, the aforementioned element X may be added as well, whereby the optical gap energy relatively easily can be adjusted so as to be in the foregoing range. The composition ratio thereof preferably is such that Te accounts for between 20 at % and 60 at % while the element X accounts for between 20 at % and 50 at %. By so doing, a material is prepared readily that exhibits sufficiently high stability in the amorphous state and has a high crystallization kinetic.

The material of the recording layer 4 preferably contains Te and the element X as the main component, and further includes the foregoing third and/or fourth materials as additives. Preferable materials as the third and fourth materials are the same as above. The composition ratio may be determined in the same manner as described above.

Specifically, examples of preferable materials containing Te include Te—In—Ge, Te—In—Sb, Te—In—Si, Te—Ga—Sb, Te—Al—Sb, Te—Al—Bi, Te—Al—Ge—N, and Te—Mn—Sb—In.

Still other examples of the material for forming the recording layer include materials containing Sb as the main component. In this case, Al—Sb, Ga—Sb, Sb—S, Sb—Se, or the like preferably is contained as the main component. These materials also can be made to have excellent phase change characteristics by adding the foregoing third and/or fourth materials. Specific examples of such a material include Sb—Al—Ge, Sb—Al—In, Sb—Al—Ga, Sb—Sn—Al, Sb—Sn—Al—N, and Sb—In—Ge—N.

It should be noted that the recording layer may contain impurities such as Ar or Kr as a sputtering gas component, H, C, or $H_2O$, whose existence is tolerable as long as their content is controlled to a level such as not to affect recording/reproduction of signals. Furthermore, in some cases, a very small amount (approximately not more than 10 at %) of another substance may be added to the main components for various purposes other than those described above. In such a case also, the content of the same preferably is controlled to a level such as not to affect recording/reproduction of signals.

The recording layer preferably has a thickness ranging from 1 nm to 25 nm, more preferably from 1 nm to 15 nm. If the thickness thereof is set less than 1 nm, it is difficult to obtain a layer of the recording material with a uniform thickness, and it is difficult to cause a change in the state that leads to a change in the optical characteristics. On the other hand, if the thickness thereof is set more than 25 nm, in-plane heat diffusion in the recording layer increases, thereby resulting in that adjacent mark erasure tends to occur upon high-density recording.

A light absorptance Ac of the recording layer in the crystalline state preferably is greater than 80% of a light absorptance Aa of the recording layer in the amorphous state. In the case of the phase-change recording material, recording marks are formed at different positions before and after information rewriting, respectively, and therefore, it is necessary to simultaneously carry out, upon rewriting, four types of phase changes, that is, "from the crystalline state to the crystalline state", "from the crystalline state to the amorphous state", "from the amorphous state to the crystalline state" and "from the amorphous state to the amorphous state". Here, the change from the crystalline state to the amorphous state requires a great amount of heat relative to an amount of heat required for the change from the amorphous state to the amorphous state, since the former change needs latent heat for melting. Therefore, when $Ac \leq 0.8Aa$, an extra amount of heat is generated at a portion where a change from the amorphous state to the amorphous state takes place, thereby causing unbalanced temperature rises in the amorphous portions and the crystalline portions. This tends to cause deformation of recording marks. However, when $Ac>0.8Aa$, temperature rises are well-balanced, whereby deformation of overwritten recording marks by no means occurs. This makes it possible to obtain excellent-quality signals. For the foregoing reason, the thicknesses of layers preferably are set so as to satisfy $Ac>0.8Aa$.

The following description will depict an example of a write-once optical information recording medium. In this case, generally, the layer configuration can be simplified as compared with the case where reversibly-changeable recording material is used, and therefore it is possible to provide a further inexpensive medium. This is because schemes for maintaining excellent erasure characteristics and repetitive recording characteristics are unnecessary. An example of the layer configuration of such a medium is shown in FIG. 10.

Figure 10:
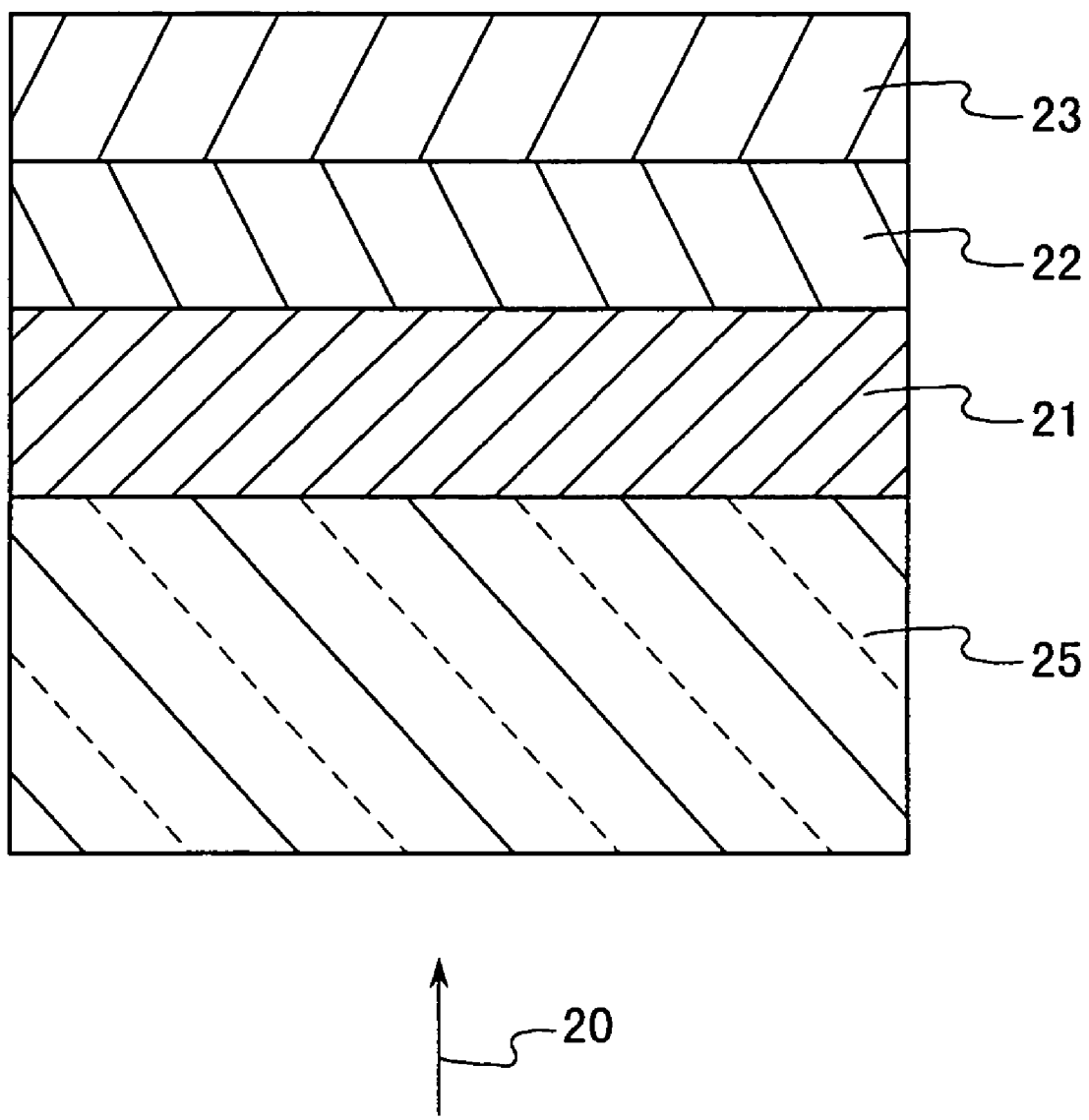
FIG. 10 is a cross-sectional view illustrating still another embodiment of a layer configuration of an optical information recording medium of the present invention.

As to FIG. 10, the same material as that for the substrate 1 shown in FIG. 1 is used for forming a substrate 25. Protective layers 21 and 23 are intended to protect the recording material and to adjust optical characteristics, and they may be made of the same materials as those for the protective films 2 and 6 shown in FIG. 1.

A recording layer 22 is made of a material that satisfies a condition that an optical gap energy $E_0$ is between 0.9 eV and 2.0 eV when the material is in the amorphous state, like the reversibly-changeable recording material. This allows an information layer to be formed that exhibits appropriate light absorption and a high transmittance with respect to light with wavelengths on the short wavelength side, particularly in a range of 300 nm to 450 nm.

The material for the recording layer 22 is required to exhibit a chemically and structurally stable state after writing, to be maintainable for a long period of time, and to exhibit a sufficiently remarkable change in the optical characteristics between before and after recording so that signals with sufficient magnitudes are obtained. Besides, a material that allows high-speed writing is preferable. Furthermore, to allow high-density recording, it is preferable to use a material that allows recording marks formed therein to have clearer mark edges.

As the material for forming the recording layer 22, a material that exhibits reversible transition, like that for the recording layer 4, may be used, or alternatively, a material that exhibits irreversible transition may be used. Examples of irreversible transition include structural changes such as volume change, density change, and perforation due to film damage, as well as irreversible oxidative reaction.

Examples of recording materials that exhibit volume change, density change, or perforation due to film damage include recording materials containing Se, S, or O as the main component, for instance, materials containing as the main component Se—Ge, Se—Sb, Se—Ga, Se—Ag, Se—Zn, Se—Si, Sb—S, Ge—S, Zn—S, Zn—0, In—O, Sb—O, or Si—O. Alternatively, an appropriate mixture of any of these, or any of these to which a third element is added may be used. When a laser beam irradiates a material as described above, density decrease or volume decrease is caused locally at a portion irradiated with the laser beam. By irradiation with an extremely strong laser beam, it is possible to damage the film so that the film is perforated exclusively at the position.

Some of these materials are composed of the same kinds of elements as those composing the reversibly-changeable materials described above, and it is possible to form an irreversibly changeable material by adjusting the composition ratio of the elements. For instance, in the case of Se-based materials such as Se—Ge and Se—Sb, those with compositions having a relatively great content of Se in excess of 50 at % likely are irreversibly changeable materials.

Examples of recording materials that exhibit an irreversible oxidation reaction include oxides having fewer oxygen atoms such as $SnO_x$, $SbO_x$, $SiO_x$, $ZnO_x$, and $InO_x$ (where x represents a numerical value smaller than the value in the stoichiometric composition of each material), and appropriate mixtures of any of these. These materials are oxidized when irradiated with a laser beam, and they irreversibly transition to stable compositions that are approximate to the stoichiometric compositions.

Figure 6:
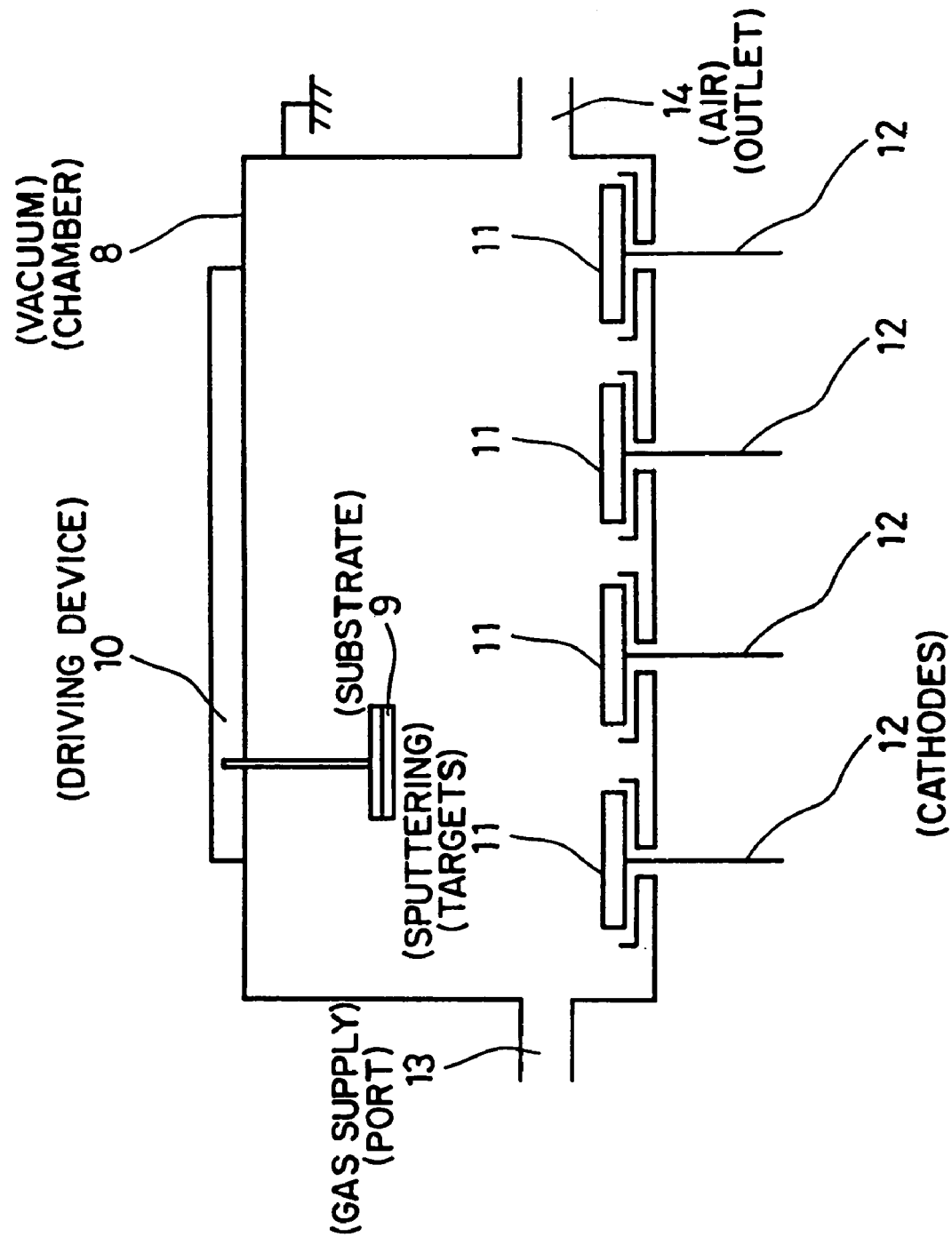
FIG. 6 is a view illustrating an example of a film forming apparatus used for producing an optical information recording medium of the present invention.

The following description will depict a method for producing an optical information recording medium. Applicable as methods for forming a multi-layer film constituting an optical information recording medium are sputtering, vapor deposition, chemical vapor deposition (CVD), etc. Here, as an example, a method for forming a multi-layer film by sputtering is described. FIG. 6 shows a schematic configuration of an example of a film forming device by sputtering. In this device, a vacuum pump (not shown) is connected to a vacuum chamber 8 via an air outlet 14 so that a high vacuum is maintained in the vacuum chamber 8. A gas supply port 13 allows nitrogen gas, oxygen gas, or a mixture of these gases to be introduced at a certain set flow rate. The device also is provided with a driving device 10 for planetary motion of the substrate 9. Sputtering targets 11 are connected with cathodes 12, respectively. The cathodes 12 are connected to a direct current power source or a high frequency power source via switches, though not shown in the drawing. By grounding the vacuum chamber 8, the vacuum chamber 8 and the substrate 9 are maintained to be anodes. Used as a film forming gas is a rare gas, or a rare gas to which a very small quantity of nitrogen and oxygen is added. Ar, Kr or the like may be used as the rare gas.

To form the recording layer 4 and the protective layers 2 and 6, a gas mixture composed of a rare gas and a very small quantity of nitrogen or oxygen preferably is used. This allows mass transfer upon repetitive recording of the medium to be suppressed, thereby resulting in improvement of the repetitive recording characteristics.

Furthermore, in the case where a nitride, oxide, or oxynitride is used as the main component constituting the interface layers 3 and 5, a film with excellent quality is obtained by reactive sputtering. For instance, in the case where Ge—Cr—N is used for forming the interface layers, a material containing Ge and Cr and a gas mixture composed of a rare gas and nitrogen may be used as the target and as the film forming gas, respectively. Alternatively, a gas mixture composed of a rare gas and a gas whose molecule contains at least one nitrogen atom, such as $N_2O$, $NO_2$, NO, or $N_2$ may be used.

Figure 7:
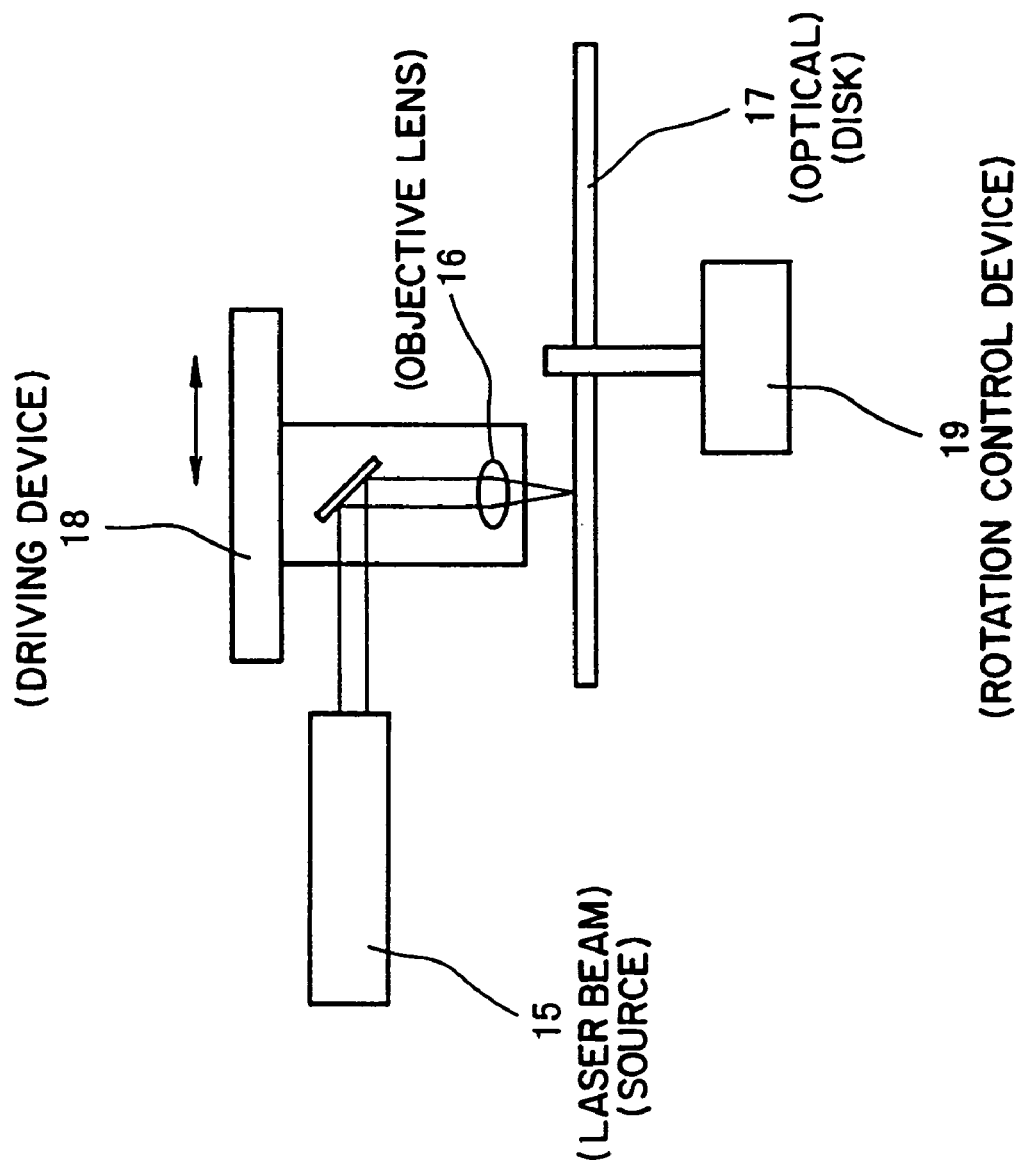
FIG. 7 is a view illustrating an example of a device used for recording/reproduction of information to/from an optical information recording medium of the present invention.

The following description will explain a method for recording/reproducing on/from an optical information recording medium. FIG. 7 shows, as one example, a schematic configuration of a device used for recording/reproduction. For recording, reproduction and erasure of signals, this device is provided with a laser beam source 15, an optical head on which an objective lens 16 is mounted for converging the laser beam to a microspot, a driving device 18 for guiding a portion to be irradiated with the laser beam to a predetermined position, a tracking control device and focusing control device (not shown) for controlling the position in the perpendicular direction to the tracking direction and the film surface, a laser driving device (not shown) for modulating a laser power, and a rotation control device 19 for rotating the optical information recording medium (optical disk 17).

Recording and erasure of signals is carried out by rotating the optical disk 17 by means of the rotation control device 19 and by irradiating the medium with the laser beam converged to a microspot by means of the optical system. An amorphous-state-producing power level of the laser beam that causes only a portion of the recording layer irradiated with the laser beam to reversibly change to the amorphous state is given as $P_1$, while a non-amorphous-state-producing power level thereof that causes an irradiated portion to reversibly change to a non-amorphous state such as a crystalline state is given as $P_2$. By switching the laser power between $P_1$ and $P_2$, recording marks are formed or erased, so that information is recorded, erased, or overwritten. Irradiation with the laser beam having the power level $P_1$ preferably is carried out according to a pulse string, that is, a so-called multiple pulse.

Furthermore, a power level that is lower than both of $P_1$ and $P_2$, laser irradiation which does not affect an optical state of a recording mark but allows a sufficient reflectance to be obtained for reproduction of recording marks from the medium is given as a reproduction power level $P_3$, and signals from the medium that are obtained by irradiation with the laser beam having the power level $P_3$ are read by a detector (not shown), so that information is reproduced.

A wavelength of the laser beam used for recording/reproduction preferably is not more than 450 nm, for instance, in a range of 300 nm to 450 nm, particularly in a range of 350 nm to 450 nm. This is intended to cause an effect of the medium of the present invention to be exhibited fully, thereby allowing high-density recording. Incidentally, the laser wavelength for recording signals and the laser wavelength for reproduction are not necessarily the same. Furthermore, in the case of a multi-layer recording medium for which recording/reproduction can be carried out from one side, laser wavelengths for recording/reproduction the respective media may be all the same, or may be partly different.

An optical information recording medium of the present invention preferably is configured so as to be a so-called multi-layer recording medium. Further, the recording medium could be configured so that recording/reproduction to/from a plurality of information layers is conducted by laser irradiation from only one side, whereby higher-density recording is ensured.

Figure 8:
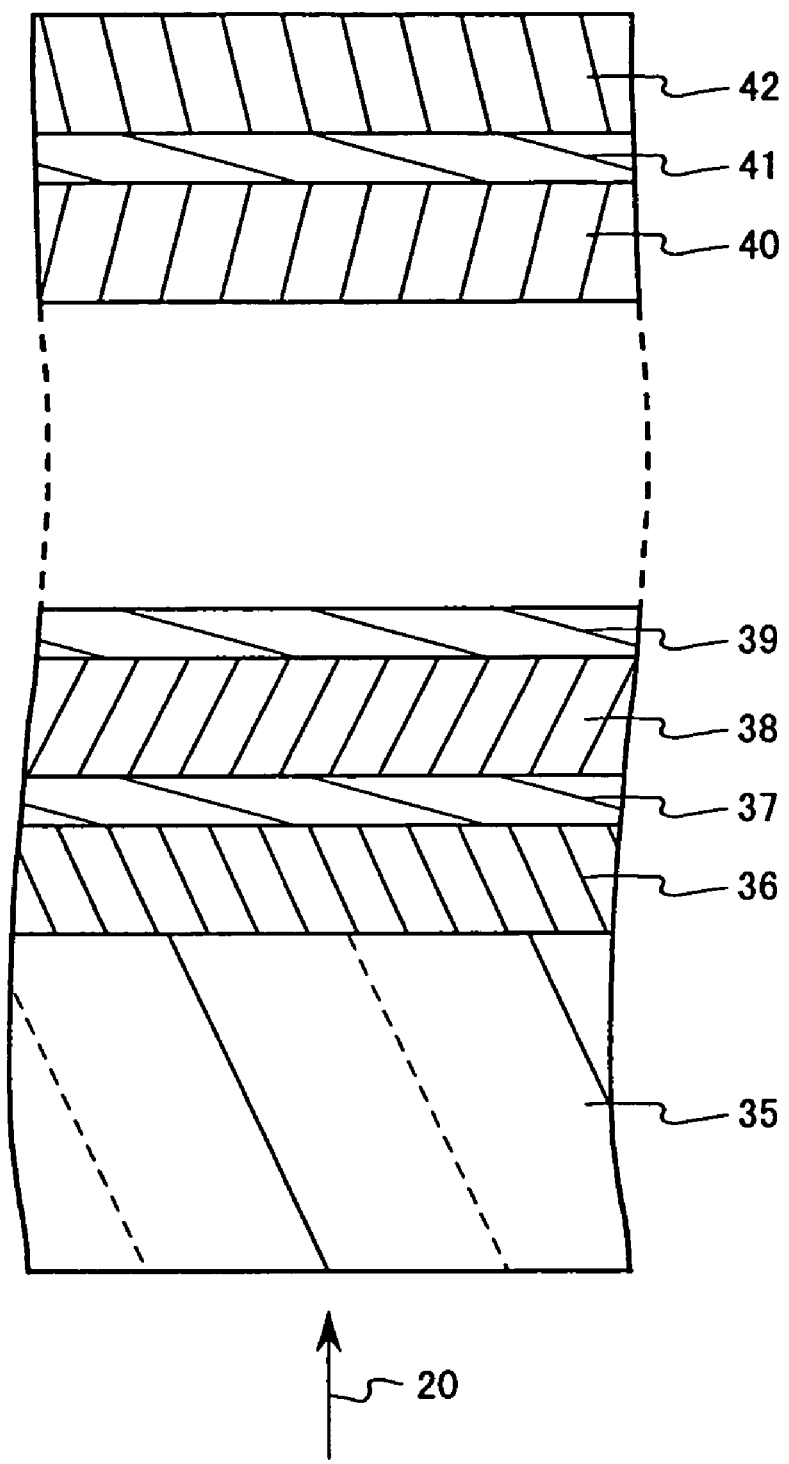
FIG. 8 is a cross-sectional view illustrating another embodiment of a layer configuration of an optical information recording medium of the present invention.

FIG. 8 illustrates an example of a configuration of a light-transmission-type multi-layer recording medium. In this medium, n sets of information layers (n is a natural number satisfying n≧2) are laminated on a substrate 35, with separating layers 37, 39, . . . and 41 interposed therebetween. In this case, the information layers except the n'th information layer 42, that is, the information layers from the laser incident side to the (n−1)th information layer (from a first information layer 36, a second information layer 38, to the (n−1)th information layer 40), preferably are configured so as to be light-transmission-type information layers. The light-transmission-type information layer is configured so that the transmittance of the laser beam is not less than 30% (preferably, not less than 50%). In this case, it is possible to carry out recording/reproducing to the k'th medium (k is a natural number satisfying 1<k≦n) only by laser irradiation from one side, beyond the first through (k−1)th media. However, a configuration satisfying 2≦n≦4, that is, having two to four information layers, is practical.

The separating layers 37, 39, . . . , and 41 preferably are transparent layers, and can be made of a resin such as a UV-hardening-type resin or a slow-acting resin, or a dielectric.

It should be noted that, as the n'th information layer 42, a recording layer made of a conventional recording material that is optimized for the red wavelength range may be adapted, but it is more advantageous for optical designing to adapt an information layer characterized according to the present invention. Furthermore, any one of the information layers may be configured so as to be a read-only information layer (read only memory (ROM)), or a write-once information layer.

The following description depicts the multi-layer recording medium in more detail, by taking a case where n=2 as an example.

Figure 9:
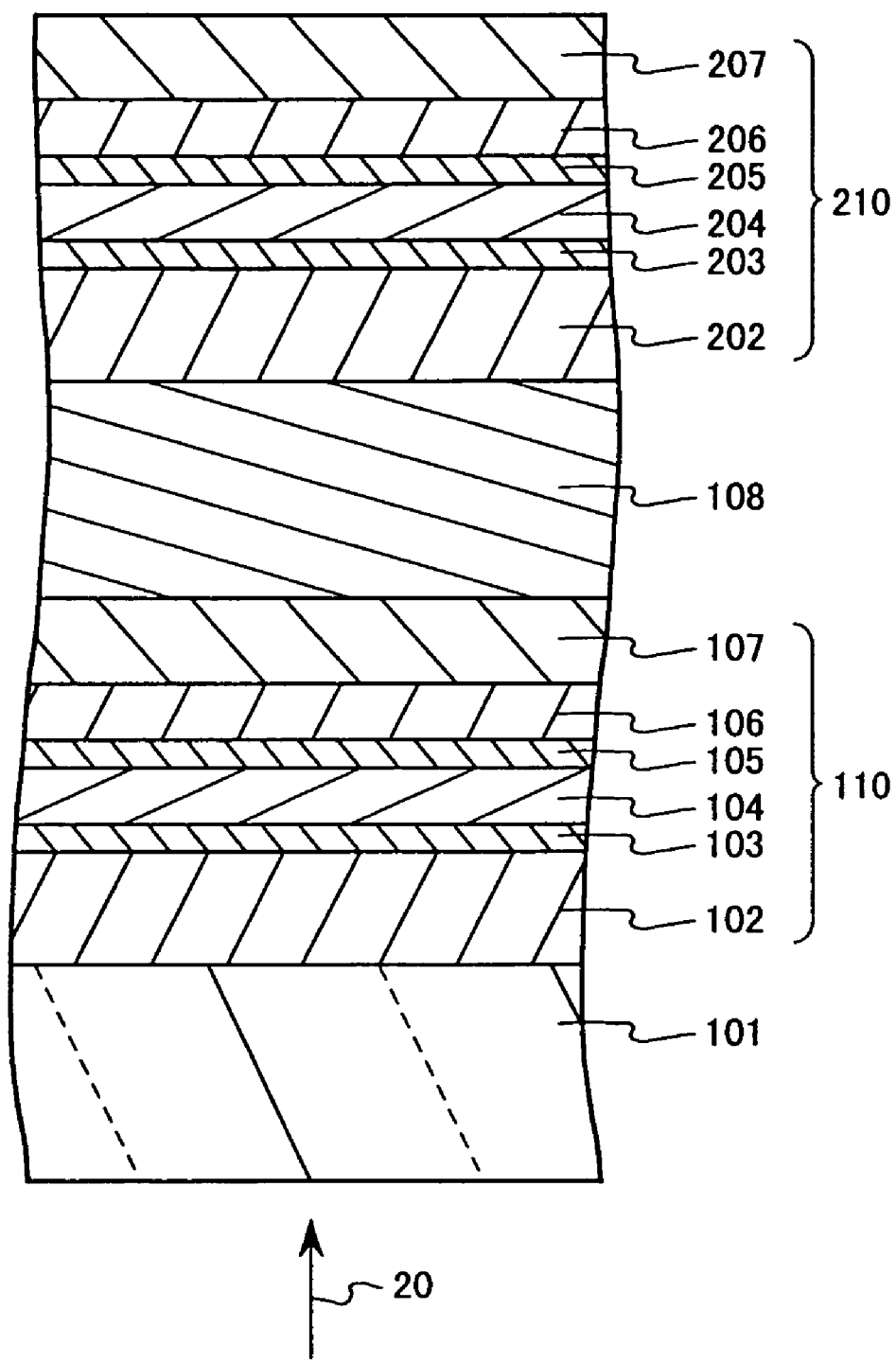
FIG. 9 is a cross-sectional view illustrating still another embodiment of a layer configuration of an optical information recording medium of the present invention.

FIG. 9 is a cross-sectional view of one embodiment of a multi-layer recording medium having two sets of media. In this embodiment, a first information layer 110 is composed of a first protective layer 102, a first interface layer 103, a recording layer 104, a second interface layer 105, a second protective layer 106, and a reflection layer 107 that are laminated in the stated order from the side of a substrate 101, and likewise, a second information layer 210 is composed of a first protective layer 202, a first interface layer 203, a recording layer 204, a second interface layer 205, a second protective layer 206, and a reflection layer 207 that are laminated in the stated order from the side of the substrate 101. Between the information layers 110 and 210, a separating layer 108 is provided, which is intended mainly to optically separate these information layers.

The separating layer 108 is made of a material that exhibits as small a light absorption as possible to the laser beam. More specifically, a resin made of an organic material such as a UV-hardening resin or a slow-acting resin, an optical-disk-use double-sided adhesive sheet, an inorganic dielectric such as $SiO_2$, $Al_2O_3$, or ZnS, a glass material, etc. are applicable preferably. It is necessary to cause the separating layer 108 to have a thickness of not less than twice a depth of focus ΔZ of the laser beam so that upon recording/reproduction of one of the media, crosstalk from the other medium is suppressed to an ignorable level. Here, the depth of focus ΔZ from a reference point at which light intensity is 80% of the light intensity at the focal point in the case of non aberration is expressed approximately by a formula (3) below:

$$\Delta Z = \lambda / \{2 \times (NA)^2\} \quad (3)$$

Here, NA represents a numerical aperture of the objective lens, and λ represents a wavelength of the laser light upon recording/reproduction. For instance when λ=400 nm and NA=0.60, the depth of focus ΔZ is 0.56 μm. In other words, since a range of approximately ±0.60 μm is included in the depth of focus, the separating layer 108 preferably has a thickness of more than 1.20 μm. Incidentally, the thickness of the separating layer 108 preferably is in a range of a permissible tolerance of the objective lens, so that a distance between two information layers falls in a range in which the objective lens is able to converge light.

To the second information layer 210, information is recorded/reproduced by the laser beam that has passed through the first information layer 110. Therefore, a reflectance $r_2$ upon reproduction of the second information layer beyond the first information layer is expressed by a formula (4) below:

$$r_2 = R_2 \times T_1 \times T_1 \quad (4)$$

where $T_1$ and $R_1$ represent a transmittance and a reflectance of the first information layer with respect to the laser beam for recording/reproduction, and $R_2$ represents a reflectance of the second information layer.

Furthermore, as to a signal amplitude, the relationship expressed by a formula (5) below is satisfied:

$$\Delta r_2 = \Delta R_2 \times T_l \times T_l \quad (5)$$

where $\Delta R_2$ represents a differential reflectance of the second information layer per se, and $\Delta r_2$ represents a differential reflectance of the second information layer when being reproduced beyond the first information layer.

For instance, when $\Delta R_2$=24% and $T_1$=50%, the differential reflectance $\Delta r_2$ upon reproduction of the second information layer beyond the first information layer is obtained as $\Delta r_2$=24%×0.5×0.5=6%. To obtain sufficient signals from the second information layer, it is preferable that the transmittance of the first information layer is set as high as possible, while the signal amplitude of the second information layer is set as great as possible. Simultaneously, it is preferable that the differential reflectance of the first information layer is set to a certain high level, while the recording sensitivity of the second information layer is set high. The optical design of the first and second information layers is determined so that these factors are all well-balanced.

The following description will depict a specific example of the optical design. As one example, the first and second information layers are optically designed so that the first information layer has a reflectance $R_1c$ of 7.5% when the recording layer 104 is in the crystalline state and a reflectance $R_1a$ of 0.5% when it is in the amorphous state, the second information layer 210 has a reflectance $R_2c$ of 15% when the recording layer 204 is in the crystalline state and has a reflectance $R_2a$ of 43% when it is in the amorphous state. Furthermore, the transmittance of the first information layer when recording is conducted only on the first information layer is set to 50%. The foregoing optical characteristics are adjusted by varying the respective thicknesses of the recording layer 104, the protective layers 102 and 106 and the reflective layer 106.

In the foregoing example, the differential reflectance when the recording/reproduction on/from the second information layer 210 is carried out beyond the first information layer was obtained as (43−15)×0.5×0.5=7%, and the differential reflectance of the first information layer 110 was obtained as 7.5−0.5=7%. Thus, it is preferable that differential reflectances, that is, signal amplitudes, of the first and second information layers are set substantially equal. This is because the tracking is unstabilized if the signal amplitude extremely varies when a target of recording/reproduction is shifted from an information layer to another.

Since it is very difficult to obtain compatibly a high transmittance of the first information layer and a high differential reflectance of the second information layer, the differential reflectance as a result of designing is relatively small, and hence the signal amplitude is relatively small. In this case, it is preferable that the power level $P_3$ of the light beam for reproduction is set relatively higher than conventionally so that a great reproduction signal amplitude is obtained. If the level of $P_3$ is set excessively high, however, recording marks are thermally affected, resulting in deterioration of the reproduction signals. Therefore, the reproduction power level of $P_3$ preferably is set in a range such that it does not cause the signal deterioration. Incidentally, the reproduction power levels for the first information layer and the second information layer may differ from each other. Besides, the wavelengths of the laser beams for reproduction of the information layers may differ from each other, but ordinarily laser beams with the same wavelength are used.

The light transmittance of the first information layer when information is reproduced from the second information layer preferably is not less than 30%, more preferably not less than 50%. The signal amplitude upon recording/reproduction of information on/from the second information layer beyond the first information layer has a value multiplied by a square of the transmittance of the first information layer. Therefore, if the light transmittance of the first information layer is smaller than 30%, the signal amplitude has a value multiplied by 0.09 or less, which is considerably small. Therefore, to bring the signal amplitudes of both the information layers into balance, the light transmittance of the first information layer has to be set to a certain high level. Besides, if the transmittance of the first information layer is set very low, for instance less than 30%, a quantity of light reaching the second information layer significantly decreases, thereby causing the recording sensitivity of the second information layer to deteriorate.

Furthermore, the reflectance $R_1c$ with respect to the laser beam when the recording layer 104 of the first information layer is in the crystalline state preferably is higher than the reflectance $R_1a$ when the recording layer 104 is in the amorphous state. This is because Rc has to be higher than a certain value (for instance, 5% to 10%) in order to enable stable tracking, and when the medium is optically designed so as to satisfy Ra>Rc>α(α is a constant positive number), the transmittance and the absorptance of the medium decrease for the foregoing α, which is a disadvantage from the viewpoint of the optical design.

EXAMPLES

The present invention will be explained in detail by way of examples below, but is not limited thereto.

Example 1

The same configuration as that shown in FIG. 9 was further configured so that: the substrate 101 was made of a polycarbonate resin in a disk form with a thickness of 0.6 mm and a diameter of 120 mm; protective layers 102, 106, 202, and 206 all were made of ZnS containing 20 mol % of $SiO_2$; the interface layers 103, 105, 203, and 205 all were made of GeCrN; the reflection layer 107 was made of an AgPdCu alloy; the reflection layer 207 was made of an AgPdTi alloy; the recording layer 104 was made of $Ge_{20}In_{45}Se_{30}Cr_5$; and the recording layer 204 was made of $Ge_4Sb_2Te_7$. The thicknesses of these layers were set as follows: the recording layers 104 and 204 were 7 nm and 9 nm in thickness, respectively; the interface layers 103, 105, 203, and 205 were 2 nm in each thickness; the reflection layers 107 and 207 were 5 nm and 60 nm in thickness, respectively; the protective layers 102 and 106 were 65 nm and 45 nm in thickness, respectively; and the protective layers 202 and 206 were 90 nm and 40 nm, respectively.

Incidentally, in setting the thicknesses of the protective layers 102 and 106, optical characteristics that the medium had when the respective thicknesses were varied from 0 to $\lambda/2n$ ($\lambda$ represents a wavelength of the laser beam and n represents a refractive index of the material of the protective layer with respect to the wavelength $\lambda$) were considered. According to this, the thicknesses of the protective layers 102 and 106 were selected that provide a high transmittance and a high differential reflectance of the first information layer. Furthermore, a substrate on which grooves and lands were formed alternately at a track pitch of 0.39 µm was adapted as the substrate 101.

Here, for forming the recording layers 104 and 204, Ar gas containing 2.5% of nitrogen was supplied so that a total pressure of 0.13 Pa was obtained, and a DC power of 1.27 W/cm² was fed to the cathodes. For forming the protective layers 102, 106, 202 and 206, Ar gas containing 1.0% of oxygen was supplied so that a total pressure of 0.13 Pa was obtained, and a RF power of 5.10 W/cm² was supplied to the cathodes. For forming the reflection layers 107 and 207, Ar gas was supplied so that a total pressure of 0.26 Pa was obtained, and a DC power of 4.45 W/cm² was supplied. For forming the interface layers 103, 105, 203, and 205, a target material was GeCr, a sputtering gas was a gas mixture of Ar and nitrogen (partial pressure of nitrogen: 30%), a sputtering gas pressure was set to 1.33 Pa, and a RF sputtering power density was set to 6.37 W/cm².

Characteristics of the disk were evaluated according to the results of measurement of the transmittance of the first information layer, and C/N ratios and overwrite erasure rates of both the first and second information layers. The (8–16) modulation system was adapted as the signaling system for recording, and a laser beam with a wavelength of 400 nm and an objective lens with a numerical aperture of an objective lens of 0.60 were used for both the first and second information layers. The shortest mark length was set to 0.26 µm and the disk rotation speed was set to a linear speed of 5.0 m/s.

The C/N ratio was evaluated in the following manner: 3T-long marks were recorded with an appropriate laser power by the (8–16) modulation system, and a C/N ratio was measured. The overwrite erasure characteristic was evaluated in the following manner: after 3T-long marks were recorded with an appropriate laser power by the (8–16) modulation system, 11T-long marks were overwritten thereon with the same power, and an erasure ratio of the 3T-long marks (hereinafter referred to as "3T erasure ratio") was measured.

The transmittance of the first information layer was measured in the following manner: a signal amplitude in the case where a laser beam was transmitted through the first layer so as to reproduce signals in the second information layer, and a signal amplitude of the second information layer in the case where the first information layer was not formed, were measured so that a ratio between these signal amplitudes was determined. Then, based on this, a transmittance of the first information layer was calculated. More specifically, by covering a part of the disk as a medium or another method, a region where the first information layer is not present was formed in a part of the disk extending in the circumference direction, and the foregoing ratio was measured. Incidentally, the ratio was measured in a state in which information was recorded in the first information layer.

The laser power for reproducing signals was set to 1.0 mW for both the first and second information layers. Recording/reproduction of information on/from the second information layer was carried out in a state in which information was not recorded in the first information layer, for the sake of convenience.

Here, a medium in which the recording layer 104 was made of $Ge_{20}Sb_{30}Se_{45}In_5$ was referred to as medium (1). For comparison, a medium that was the same as the medium (1) except that the recording layer 104 was made of $Ge_2Sb_2Te_5$ was referred to as medium (0), while a medium that was the same as the medium (1) except that the recording layer 104 was made of $Al_{29}Si_{14}Se_{57}$ was referred to as medium (100). The result of the evaluation of these media is shown in Table 1.

obtained, "B" indicates that a transmittance of not less than 30% and less than 50% was obtained, and "C" indicates that a transmittance of less than 30% was obtained.

Furthermore, Table 1 also shows values of the optical gap energy $E_0$ when the recording layer 104 was in the amorphous state, which were measured in the aforementioned manner. In this measurement, the material of the recording layer 104 was formed in a film form with a thickness of 8 nm, and the wavelength-dependency of the optical constant was examined.

According to Table 1, in the medium (1), both the first and second information layers had high C/N ratios and high erasure ratios. Besides, the first information layer of the same also had a sufficiently high transmittance. On the other hand, in the medium (0), when the C/N ratio of the first information layer was set not less than 48 dB, a high transmittance was not obtained, whereby the second information layer was unable to have a high C/N ratio. Besides, the erasure ratio of the first information layer thereof was insufficient. The reason for this seems to be that compensating a difference in the light absorptance between the crystalline state and the amorphous state was difficult when the C/N ratio of the first information layer was set to be high. Thus, in the case where a material has an optical gap energy of less than 0.9 eV, an extinction coefficient ka when the recording layer 104 is in the amorphous state increases, thereby making it difficult to compatibly obtain a high transmittance and a high differential reflectance.

Furthermore, in the case of the medium (100), the transmittance was set high easily, while it was difficult to set the C/N ratio of the first information layer to a high level. This applies even when the thicknesses of the protective layers 102 and 106 were varied. The reason for this seems to be that, since the material of the recording layer had an excessively high optical gap energy $E_0$, absorption of light with wavelengths of the laser beam at the recording layer decreased, thereby resulting in that the difference between optical characteristics decreased though a high transmittance was obtained. Thus, in the case where a material having an optical gap energy of not less than 2.0 eV is used, a high transmittance is obtained easily since the extinction coefficient ka decreases sufficiently, but a signal amplitude obtained at the same time decreases excessively.

TABLE 1

| MEDIUM NO. | RECORDING LAYER MATERIAL | $E_0$ (eV) | C/N | | ERASURE RATIO | | TRANSMITTANCE |
| --- | --- | --- | --- | --- | --- | --- | --- |
| | | | $L_1$ | $L_2$ | $L_1$ | $L_2$ | $L_1$ |
| (1) | $Ge_{20}Sb_{30}Se_{45}In_5$ | 1.36 | A | A | A | A | A |
| (0) | $Ge_2Sb_2Te_5$ | 0.73 | B | C | C | B | C |
| (100) | $Al_{29}Si_{14}Se_{57}$ | 2.20 | C | B | C | C | A |

Here, $L_1$ and $L_2$ indicate the first information layer and the second information layer, respectively. As to the C/N ratio, "A" indicates that the obtained C/N ratio was not less than 50 dB, "B" indicates that the obtained C/N ratio was not less than 48 dB and less than 50 dB, and "C" indicates that the obtained C/N ratio was less than 48 dB. As to the erasure characteristic, "A" indicates that the obtained 3T erasure ratio was not less than 35 dB, "B" indicates that the obtained 3T erasure ratio was not less than 30 dB and less than 35 dB, and "C" indicates that the obtained C/N ratio was less than 30 dB. As to the transmittance of the first information layer, "A" indicates that a transmittance of not less than 50% was As other examples of the present invention, media were prepared that were the same as the medium (1) except that the recording layers 104 were made of $Ge_{18}Sb_{27}Se_{50}In_5$, $Ge_{22}Sb_{33}Se_{40}In_5$, $Ge_{24}Sb_{36}Se_{35}In_5$, and $Ge_{26}Sb_{39}Se_{30}In_5$, respectively. More specifically, the In composition ratio was maintained constant while the Se composition ratio was varied, and the contents of Ge and Sb were adjusted so that a ratio therebetween was kept constant. They are referred to as media (2) to (5), respectively. The same evaluation as described above was carried out regarding these media. The result is shown in Table 2.

TABLE 2

| MEDIUM NO. | RECORDING LAYER MATERIAL | $E_0$ (eV) | C/N $L_1$ | C/N $L_2$ | ERASURE RATIO $L_1$ | ERASURE RATIO $L_2$ | TRANSMITTANCE $L_1$ |
|---|---|---|---|---|---|---|---|
| (2) | $Ge_{18}Sb_{27}Se_{50}In_5$ | 1.40 | A | A | B | A | A |
| (3) | $Ge_{22}Sb_{33}Se_{40}In_5$ | 1.33 | A | A | A | A | A |
| (4) | $Ge_{26}Sb_{39}Se_{30}In_5$ | 1.28 | A | A | A | A | A |
| (5) | $Ge_{30}Sb_{45}Se_{20}In_5$ | 0.96 | B | A | A | A | B |

Table 2 shows that both the first and second information layers had excellent characteristics in any one of the media (2) to (5). Thus, in the case where a phase-change material having an optical gap energy $E_0$ ranging from 0.90 eV to 2.0 eV is used for forming the recording layer 104, the first medium is allowed to have a high transmittance and a high C/N ratio. Therefore, both the information layers are allowed to have high C/N ratios, respectively.

Comparing the media (1) to (5), the erasure ratio slightly decreases when the Se composition ratio in the recording layer is not less than 50 at %, while the C/N ratio slightly decreases when it is not higher than 20 at %. Therefore, the Se composition ratio particularly preferably is more than 20 at % and less than 50 at %. This preferable Se composition ratio range substantially did not change when the materials other than Se were replaced with another materials.

When Sb and In, contained in the recording layer 104, were substituted with Sn, Ge, Si, In, Ga, Al, or Bi, substantially the same excellent characteristics were obtained. Furthermore, when Ge was substituted with a material containing at least one selected from the group consisting of Al, Ga, Si, Sn, Bi, Ti, Nb, Cr, Mo, and Co, substantially the same characteristics were obtained.

Example 2

The same media as the medium (1) except that the recording layers 104 thereof were made of $Al_5Ge_{10}In_{15}Te_{70}$, $Al_5Ge_{10}In_{25}Te_{60}$, $Al_5Ge_{10}In_{45}Te_{40}$, $Al_5Ge_{10}In_{65}Te_{20}$, and $Al_5Ge_{10}In_{70}Te_{15}$, respectively, were prepared. These media are referred to as media (6) to (10), respectively. Here, the thicknesses of films constituting the first information layer were set to the same as those of the medium (1) except that the thicknesses of the protective layers 102 and 106 were set to 90 nm and 50 nm, respectively.

The second information layer had the same configuration as that of the second information layer used in the medium (1).

The same evaluation as that for the medium (1) except that the wavelength of the recording/reproduction laser beam was set to 410 nm was carried out regarding these media (6) to (10). The result is shown in Table 3.

TABLE 3

| MEDIUM NO. | RECORDING LAYER MATERIAL | $E_0$ (eV) | C/N $L_1$ | C/N $L_2$ | ERASURE RATIO $L_1$ | ERASURE RATIO $L_2$ | TRANSMITTANCE $L_1$ |
|---|---|---|---|---|---|---|---|
| (6) | $Al_5Ge_{10}In_{15}Te_{70}$ | 0.98 | B | B | B | A | B |
| (7) | $Al_5Ge_{10}In_{25}Te_{60}$ | 1.05 | A | A | A | A | A |
| (8) | $Al_5Ge_{10}In_{45}Te_{40}$ | 1.10 | A | A | A | A | A |
| (9) | $Al_5Ge_{10}In_{65}Te_{20}$ | 1.33 | A | A | A | A | A |
| (10) | $Al_5Ge_{10}In_{70}Te_{15}$ | 1.60 | B | A | B | A | A |

As illustrated in Table 3, also in the present example, excellent disk characteristics were obtained as to both the first and second information layers. According to Table 3, the Te composition ratio in the recording layer preferably is not less than 20 at % and not more than 60 at %. When the Te composition ratio is set more than 60 at %, the optical gap energy tends to decrease slightly, thereby causing the transmittance of the first information layer to decrease slightly. On the other hand, when the Te composition ratio is set to less than 20 at %, the difference between the optical characteristics in the crystalline state and the amorphous state of the recording layer 104 is slightly small, thereby causing a slightly decreased C/N ratio to be obtained. With the Te composition ratio ranging from 20 at % to 60 at %, substantially the same characteristics as described above were obtained even in the case where the materials other than Te were replaced with another materials.

When Al, Ga, Zn or Mn is used in place of In contained in the recording layer 104, substantially the same excellent characteristics were obtained. Furthermore, when Ge is substituted with a material containing at least one selected from the group consisting of Ga, Si, Sn, Bi, Ti, Nb, Cr, Mo, and Co, substantially the same characteristics were obtained.

Example 3

The foregoing description depicted examples of rewritable media, while the following description will depict examples of W/O media.

Figure 11:
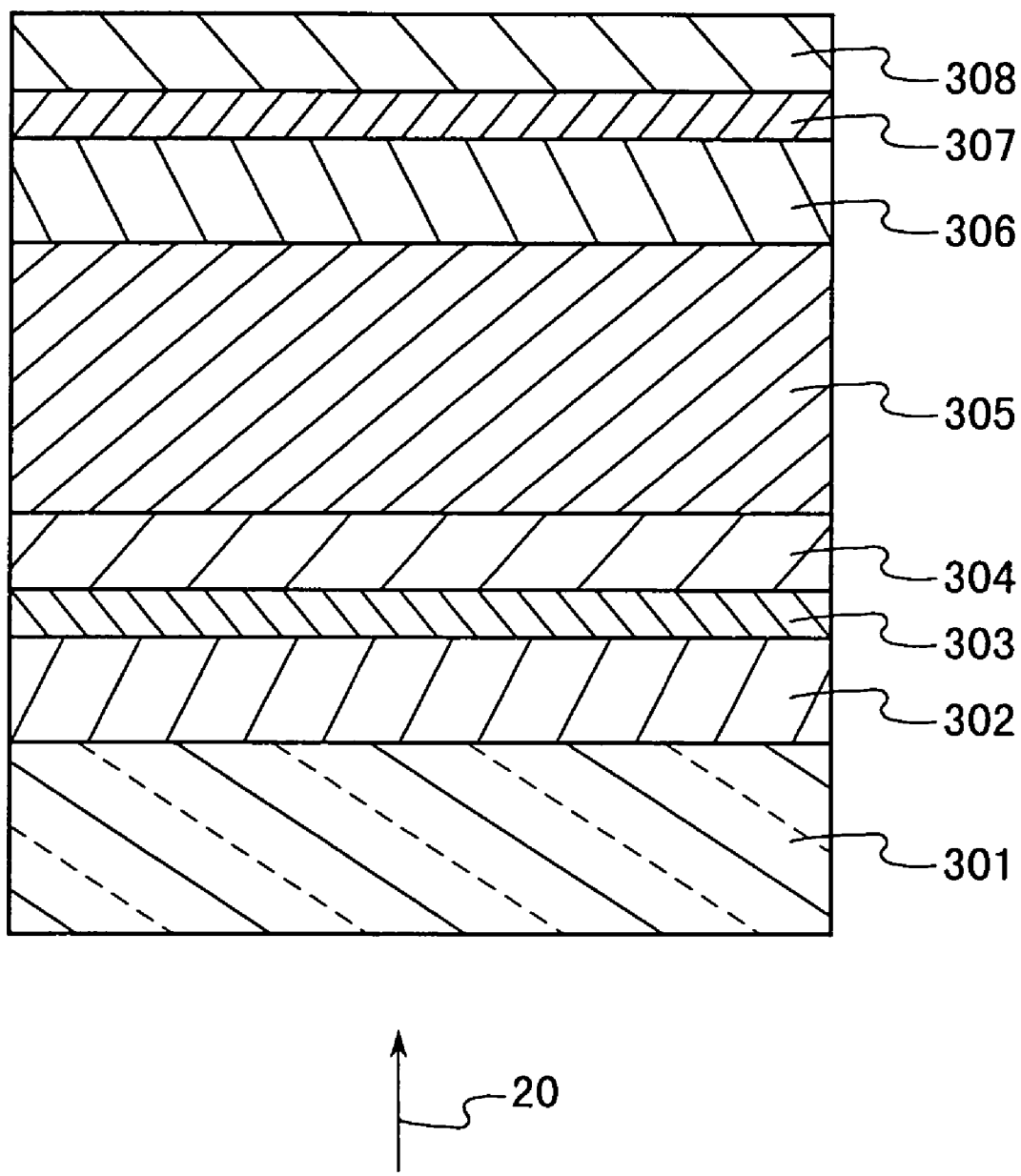
FIG. 11 is a cross-sectional view illustrating still another embodiment of a layer configuration of an optical information recording medium of the present invention.

As shown in FIG. 11, a multi-layer medium (11) was prepared that was composed of a first information layer and a second information layer. In the medium (11), the same substrate as the substrate 101 of the medium (1) was used as a substrate 301, protective layers 302, 304, 306 and 308 were made of $ZnS-SiO_2$, and recording layers 303 and 307 were made of $In_2Se_3$. To form the protective layers and the recording layers, Ar gas was supplied so that a total pressure of 0.13 Pa was obtained, and a RF power of 5.1 W/cm² and a DC power of 1.27 W/cm² were fed to the cathodes. The recording layers 303 and 307 were formed so as to be 15 nm and 40 nm in thickness, respectively, while the protective layers 302, 304, 306 and 308 were formed so as to be 30 nm, 30 nm, 65 nm and 55 nm in thickness, respectively.

Furthermore, a medium (12) was prepared that was the same as the medium (11) except that the recording layers 303 and 307 were made of $Ga_2Se_3$ and had thicknesses of 20 nm and 60 nm, respectively.

It should be noted that values of the optical gap energy $E_0$ when the recording material was $In_2Se_3$ and when it was $Ga_2Se_3$ were 1.41 and 1.65, respectively.

Characteristics of the media were evaluated by determining the transmittance of the first information layer and the C/N ratios of both the first and second information layers, as to the write-once recording of the media. The methods and conditions for determining the transmittance and the C/N ratios were the same as those in Example 1. The result is shown in Table 4.

TABLE 4

| MEDIUM NO. | RECORDING LAYER MATERIAL | $E_0$ (eV) | C/N | | TRANSMITTANCE |
|---|---|---|---|---|---|
| | | | $L_1$ | $L_2$ | $L_1$ |
| (11) | $In_2Se_3$ | 1.41 | A | A | A |
| (12) | $Ga_2Se_3$ | 1.65 | A | A | A |

Example 4

The same media as the medium (12) except that the recording layers 303 thereof were made of $Sb_2Se_3$, $Sb_2S_3$ and $Sn_{70}O_{30}$, respectively, were prepared. These media are referred to as media (13) to (15), respectively. Here, the thicknesses of the recording layers 303 of the foregoing media (13) to (15) were set to 15 nm, 20 nm, and 25 nm, respectively, while the thicknesses of the protective layers and of films constituting the second information layer of all the foregoing media were set to be the same as those of the medium (12). As shown in Table 5, all the foregoing recording media exhibited values of the optical gap energy $E_0$ in a range of 0.70 eV to 2.0 eV. The same evaluation as that for the medium (11) was carried out regarding these media. The result is shown in Table 5.

TABLE 5

| MEDIUM NO. | RECORDING LAYER MATERIAL | $E_0$ (eV) | C/N | | TRANSMITTANCE |
|---|---|---|---|---|---|
| | | | $L_1$ | $L_2$ | $L_1$ |
| (13) | $Sb_2Se_3$ | 1.39 | A | A | A |
| (14) | $Sb_2S_3$ | 1.95 | B | A | A |
| (15) | $Sn_{70}O_{30}$ | 1.55 | A | A | A |

As shown in Table 5, sufficient transmittances were obtained as to the media (13) to (15), and excellent C/N ratios were obtained as to both the first and second information layers.

As described above, by using a recording material that provides an optical gap energy ranging from 0.9 eV to 2.0 eV, setting the wavelength of laser beam used for recording in a range of 300 nm to 450 nm, and setting the transmittance of information layer with respect to the laser beam to not less than 30%, it is possible to realize an optical information recording medium having an information layer with which a high transmittance can be obtained with respect to the blue wavelength range. Therefore, it is possible to provide a multi-layer recording medium allowing high-density recording with respect to the blue wavelength range, and a method for recording/reproducing to/from the same.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising one or more information layers including recording layers, respectively, each recording layer containing a material that can exhibit transition between two optically different states in response to irradiation with a laser beam as a main component, wherein, in at least one of the recording layers, one of the two states of said material is an amorphous states, wherein said material has an energy gap ranging from 0.9 eV to 2.0 eV in the amorphous state, wherein the information layer including the recording layer that contains said material as a main component thereof has a light transmittance of not less than 30% when irradiated with a laser beam having a wavelength ranging from 300 nm to 450 nm, wherein at least one of the recording layers contains a material that can exhibit a reversible transition between a crystalline state and an amorphous state as a main component, wherein the recording layer containing the material that can exhibit a reversible transition between the crystalline state and the amorphous state as a main component satisfies a relationship expressed as:

$E_0(c) < E_0(a) - 0.15$ wherein $E_0(c)$ represents an energy gap of said material in the crystalline state, and $E_0(a)$ represents an energy gap of said material in the amorphous state.

2. The optical information recording medium according to claim 1, wherein, in at least two of the information layers, the recording layers exhibit transition between two optically different states in response to irradiation with a laser beam that is incident on said material of the recording layers from a same direction.

3. The optical information recording medium according to claim 2, wherein in at least one of the information layer closest to an incident side of the laser beam, said material as the main component of the recording layer of said information layer has an energy gap ranging from 0.9 eV to 2.0 eV in the amorphous state, and said information layer has a light transmittance of not less than 30% when irradiated with a laser beam having a wavelength ranging from 300 nm to 450 nm.

4. The optical information recording medium according to claim 1, wherein said recording layer has a thickness ranging from 1 nm to 25 nm.

5. The optical information recording medium according to claim 1, wherein the recording layer containing the material that can exhibit a reversible transition between the crystalline state and the amorphous state as a main component has a thickness ranging from 1 nm to 15 mm.

6. The optical information recording medium according to claim 1, wherein, as to the recording layer containing the material that can exhibit a reversible transition between the crystalline state and the amorphous state as a main component, a reflectance Rc of said recording layer with respect to the laser beam when said recording layer is in the crystalline state is higher than a reflectance Ra thereof with respect to the laser beam when said recording layer is in the amorphous state.

7. The optical information recording medium according to claim 1, wherein, as to the recording layer containing the material that can exhibit a reversible transition between the crystalline state and the amorphous state as a main component, a light absorptance Ac of said recording layer with respect to the laser beam when the recording layer is in the crystalline state is greater than 80% of a light absorptance Aa thereof when said recording layer is in the amorphous state.

8. The optical information recording medium according to claim 1, wherein the recording layer containing the material that can exhibit a reversible transition between the crystalline state and the amorphous state as a main component satisfies a relationship expressed as:

na>2.5;
nc>2.5; and
ka<2.0 where nc represents a refractive index of said material in the crystalline state, na represents a refractive index of said material in the amorphous state, and ka represents an extinction coefficient of said material in the amorphous state.

9. An optical information recording medium according to claim 8, wherein the recording layer containing the material that can exhibit a reversible transition between the crystalline state and the amorphous state as a main component satisfies a relationship expressed as:

$|kc-ka| \geq 0.5$ where kc represents an extinction coefficient of said material in the crystalline state.

10. The optical information recording medium according to claim 8, wherein the na and nc satisfy a relationship expressed as:

$na-nc \leq 1.0$.

11. The optical information recording medium according to claim 1, wherein said recording layer contains Se, and a content of Se in said recording layer is not less than 20 at % and not more than 60 at %.

12. The optical information recording medium according to claim 11,
wherein said recording layer further contains at least one element selected from the group consisting of Al, Ga, In, Si, Ge, Sn, Sb, Bi, Sc, Ti, Nb, Cr, Mo Co, Cu, Ag, Au, Pd, N, and O.

13. The optical information recording medium according to claim 1, wherein said recording layer contains Te and X, X representing at least one element selected from the group consisting of In, Al, Ga, Zn, and Mn,
wherein a content of Te in said recording layer is between 20 at % and 60 at % and
a content of X therein is between 20 at % and 50 at %.

14. The optical information recording medium according to claim 13,
wherein said recording layer further contains at least one element selected from the group consisting of Al, Ga, In, Si, Ge, Sn, Sb, Bi, Sc, Ti, Nb, Cr, Mo CO, Cu, Ag, Au, Pd, N, and O.

15. The optical information recording medium according to claim 1, wherein the information layer including said recording layer has a crystallization promoting layer that is provided on at least one side of said recording layer so as to be in contact with a surface of said recording layer on the side.

16. The optical information recording medium according to claim 15, wherein the crystallization promoting layer contains N.

17. An optical information recording/reproducing system, comprising the optical information recording medium according to claim 1, and a laser beam source that generates a laser beam for irradiating the optical information recording medium, wherein the laser beam has a wavelength ranging from 300 nm to 450 nm.

* * * * *

UNITED STATES PATENT AND TRADEMARK OFFICE
CERTIFICATE OF CORRECTION

PATENT NO. : 7,009,930 B1
APPLICATION NO. : 09/913430
DATED : March 7, 2006
INVENTOR(S) : Uno et al.

It is certified that error appears in the above-identified patent and that said Letters Patent is hereby corrected as shown below:

Title Page, Item (56), other publications, line 5: "(Feb. 2003), no day." should read --(Feb. 2003).--
Column 26, line 22(claim 1): "amorphous states" should read --amorphous state--

Signed and Sealed this

Thirteenth Day of February, 2007

JON W. DUDAS
*Director of the United States Patent and Trademark Office*